United States Patent [19]
Kumar

[11] Patent Number: 5,835,129
[45] Date of Patent: Nov. 10, 1998

[54] MULTIPOINT DIGITAL VIDEO COMPOSITION AND BRIDGING SYSTEM FOR VIDEO CONFERENCING AND OTHER APPLICATIONS

[75] Inventor: Arun Kumar, St. Louis, Mo.

[73] Assignee: Southwestern Bell Technology Resources, Inc., Austin, Tex.

[21] Appl. No.: 728,423

[22] Filed: Oct. 10, 1996

Related U.S. Application Data

[63] Continuation of Ser. No. 307,250, Sep. 16, 1994, abandoned.
[51] Int. Cl.[6] ............................. H04M 11/00; H04N 7/14
[52] U.S. Cl. ................................................ 348/15; 348/16
[58] Field of Search ......................... 348/14–17; 379/93, 379/96–98, 201, 202; H04N 7/14, 7/15

[56] References Cited

U.S. PATENT DOCUMENTS

| | | |
|---|---|---|
| 3,636,265 | 1/1972 | Kikuchi et al. . |
| 4,054,908 | 10/1977 | Poirier et al. . |
| 4,650,929 | 3/1987 | Boerger et al. . |
| 4,931,872 | 6/1990 | Stoddard et al. . |
| 4,965,819 | 10/1990 | Kannes . |
| 4,995,071 | 2/1991 | Weber et al. . |
| 5,003,532 | 3/1991 | Ashida et al. . |
| 5,157,491 | 10/1992 | Kassatly . |
| 5,382,972 | 1/1995 | Kannes ...................................... 348/15 |
| 5,408,274 | 4/1995 | Chang et al. . |
| 5,446,491 | 8/1995 | Shibata et al. ............................ 341/15 |

OTHER PUBLICATIONS

Chang et al., S.F., "A New Approach to Decoding and Compositing Motion–Compensated DCT–Based Images", I.E.E.E. International Conference on Acoustics, Speech, and Signal Processing 1993 (ICASSP'93), Minneapolis, Minnesota (Apr. 1993), pp. V421–V424.

ANSI T1.314—1991: "Digital Processing of Video Signals—Video Coder/Decoder for Audiovisual Services at 56 to 1536 Kbits/s," ANSI, New York, 1991.

P.P. Vaidyanathan, "Multirate Systems and Filter Banks," Prentice Hall, Englewood Cliffs, New Jersey, 1989, Chapter 3.

A.V. Oppenheim and R.W. Schafer, "Discrete–Time Signal Processing," Prentice Hall, Englewood Cliffs, New Jersey, 1989, Chapter 3.

T.A. Ramstad, "Digital Methods for Conversion Between Arbitrary Sampling Frequencies," IEEE Trans. On A.S.S.P., vol. ASSP–32, No. 3, Jun. 1984, pp. 577–591.

M. Frazier and A. Kumar, "An Introduction to the Orthonormal Wavelet Transform On Discrete Sets," pp. 51–95 in Benedetto and Frazier (eds.) Wavelets: Mathematics and Applications, CRC Press, Inc. Boca Raton, FL, 1994.

N. Young, "An Introduction to Hilbert Space," Cambridge U. Press, Cambridge, England, 1988, Chapter 4.

A. Kumar, "Time–Frequency Analysis and Transform Coding," D.Sc. Dissertation, Dept. Comp. Sc. Wash. U. St. Louis, MO, 1990.

(List continued on next page.)

Primary Examiner—Wing F. Chan
Attorney, Agent, or Firm—Greenblum & Berstein, P.L.C.

[57] ABSTRACT

A flexible multipoint composition and bridging system is provided for video signal composition and bridging of a plurality of geographically dispersed locations. The system includes a centrally located bridging unit that receives video, audio and data signal substreams from each of the remote locations. Based on the data substreams from each location, the bridging unit resizes, cuts and pastes the various images into separate video montage images for display at each of the locations. The system enables users to optionally display video images or signals from one or more of the other locations within separate display windows at their respective terminals. The display windows can be zoomed, panned, scaled, translated, and partially or wholly occluded depending on a user's preferences or needs. The video images may be composed in signal space or entirely in transform space. Further, the flexible multipoint bridging system may be used for various applications, including video conferencing and broadcasting.

41 Claims, 9 Drawing Sheets

OTHER PUBLICATIONS

Y. Meyer, "Wavelets: Algorithms and Applications," Soc. for Indust. and Appl. Math., Philadelphia, PA, 1993, Chapter 4.

A. Kumar, D.R. Fuhrmann, M. Frazier and B. Jawerth, "A New Transform for Time–Frequency Analysis," IEEE Trans. On Signal Processing, vol. 40, No. 7, Jul. 1992, pp. 1697–1707.

J. Mavor, M.A. Jack and P.B. Denyer, "Introduction to MOS LSI Design," Addison–Wesley Publishing Co., Reading, MA 1983, Chapter 4.

C. Mead and L. Conway, "Introduction to VLSI Systems," Addison–Wesley Publishing Co., Reading, MA, 1980, Chapter 3.

I.N. Herstein, "Topics in Algebra," Second Edition, John Wiley & Sons, New York, 1975, Chapter 5.

R.E. Blahut, "Fast Algorithms for Digital Signal Processing," Addison–Wesley Publishing Co., Reading, MA, 1985, Chapters 2 and 5.

W.K. Jenkins, "Finite Arithmetic Concepts," pp. 611–675 in Mitra and Kaiser (eds.) in the book Handbook for Digital Signal Processing, John Wiley & Sons, New York, 1993.

MULTIPOINT DIGITAL VIDEO COMPOSITION AND BRIDGING SYSTEM FOR VIDEO CONFERENCING AND OTHER APPLICATIONS

This application is a continuation of application Ser. No. 08/307,250, filed Sep. 16, 1994, now abandoned.

BACKGROUND OF THE INVENTION

1. Field of the Invention

The present invention generally relates to the field of communication systems. More particularly, the present invention relates to a versatile multipoint video composition and bridging system for connecting a plurality of geographically dispersed locations during, for example, a video conference or broadcast.

2. Background Information

Systems for video conferencing and broadcasting over a communication network provide several advantages to users that are located at different remote locations. For example, such systems enable information and images to be transmitted quickly and in real time to a plurality of different locations, and reduce travel time and costs usually incurred by remotely located participants and users. Video conferencing and broadcasting systems may be used for many different applications, including business and work conferences, classroom and tutorial lectures, and courtroom proceedings where, for example, witnesses are located at geographically dispersed areas.

Several different types of video conferencing systems have been developed. For example, ASHIDA et al., U.S. Pat. No. 5,003,532, discloses a multipoint conferencing system for establishing a video conference among three or more remote sites, and POIRIER et al., U.S. Pat. No. 4,054,908, discloses a video telephone conference system in which a plurality of remotely located sites are interconnected by a video switching network. Further, KIKUCHI, U.S. Pat. No. 3,636,265, discloses a television conference telephone system that utilizes a telephone switching network or exchange to interconnect remotely located conference attendants.

In such past attempts, the selection of the video image or signal to be transmitted to all locations has sometimes been done based on the determination of the location with the loudest audio signal (i.e., the "dominant voice" location), so that all participants receive the video image from the location of the conference attendant that is currently talking. Alternatively, the distribution of video images to remote locations has been based upon control signals which are received from each of the locations (see, for example, ASHIDA et al., U.S. Pat. No. 5,003,532), or the video image seen at all locations has been selected by a designated chairperson. While such past attempts have facilitated video teleconferencing among a plurality of participants, they are limited in that only one, or in some cases the same, video image is transmitted to all participating locations at any given time.

Video conferencing system users often desire to simultaneously see more than one video image or signal at their location. As such, there have been attempts to provide a video conferencing system in which multiple video images, including that from the "dominant voice" location, are transmitted to all participants' locations. See, for example, STODDARD et al., U.S. Pat. No. 4,931,872, which discloses a video teleconference system in which quad-split screens are provided at each remote location, so that video images from four other locations may be simultaneously displayed at a remote location. In multipoint video conferencing systems, analog quad-units have been provided to display video images from up to four locations on a single screen. Such analog quad-units accept up to four analog National Television Standards Committee (NTSC) video signals, and generate a single composite NTSC signal.

While quad-units facilitate the display of multiple images in video conferencing systems, for example, such units are limited in that they do not allow the simultaneous display of more than four images. Further, the use of analog quad-units, such as those described above, results in degraded picture quality due to repeated translations between analog and digital signal representations. In addition, conferencing through the use of analog quad-units requires a pair of video codecs (coder-decoder) for each participating site and, thus, is an expensive solution. Moreover, video conferencing and broadcasting systems that incorporate quad-units do not allow for windowed display of multiple images in scaled and other arbitrary formats.

In order to overcome such drawbacks, attempts have been made to provide more versatile multipoint conferencing systems. For example, BOERGER et al., U.S. Pat. No. 4,650,929, discloses a video conferencing system that includes a central station for receiving control signals from each of the remote locations to control the split-screen display of large and small video images at a user's or participant's terminal. Further, KASSATLY, U.S. Pat. No. 5,157,491, discloses a video broadcasting and teleconferencing system in which participants may chose particular display formats and particular video images to be displayed at their location. See, also, for example, WEBER et al., U.S. Pat. No. 4,995,071, which discloses a video conference system in which each location is provided with a split screen with control symbols for controlling various attributes of the received video and audio signals.

These past attempts have provided more versatility in multipoint conferencing systems, by enabling users to individually control the type of display at their location. However, they have not provided a great degree of versatility, nor have they overcome all of the above-noted drawbacks and disadvantages of prior systems. There is still a need for a video conferencing and broadcasting system that provides each remotely located user with the option to display images from multiple locations simultaneously in separate windows that can be selectively arranged by the user in arbitrary formats (e.g., scaled, translated, and partially or wholly occluded) in order to produce a video montage. Further, there is currently a need for such a system that efficiently resizes, cuts, and pastes, etc. the composited images while maintaining good image quality.

SUMMARY OF THE INVENTION

In view of the foregoing, the present invention, through one or more of its various aspects, embodiments and/or specific features or sub-components thereof, is thus presented to bring about one or more objects and advantages, such as those specifically noted below.

A general object of the present invention is to provide a versatile multipoint system for video signal composition and bridging of a plurality of geographically dispersed users.

More particularly, an object of the present invention is to provide a versatile multipoint conferencing system that enables each remotely located user to optionally display images from multiple locations simultaneously, in separate windows that can be arranged in arbitrary formats.

Another object of the present invention is to provide a video conferencing system that enables users to display video images from other locations simultaneously in separate windows that can be independently scaled, translated, and partially or wholly occluded, zoomed, and panned.

Still another object of the invention is to provide a flexible multipoint system that efficiently resizes, cuts and pastes composited images while maintaining good image quality.

Yet another object of the present invention is to provide a versatile video composition and bridging system in which video montages are produced from digital signal representations, in order to avoid degradations due to repeated translations between analog and digital signal representations.

Digital signal representations signals are of two kinds, namely signal space representations and transform space representations. Compressed digital video is transmitted and received in a transform space. A receiving codec (coder-decoder) may perform an inverse transformation in order to recover the signal space representation. Further, motion compensation may be interwoven with the transformation processes.

Another object of the present invention is to provide a versatile video composition and bridging system in which video montages are produced from the signal space representations of the incoming images. The incoming images in transform space can be inverse transformed to the signal space through the use of an appropriate inverse transform operation, e.g., using the Inverse Blocked Discrete Cosine Transform ($BDCT^{-1}$), together with inverse motion compensation. The choice of the inverse transform operation used for each video input may be determined by the forward transform operation used by the corresponding transmitting codec. Once montages are created in the signal space, they can be transformed from the signal space into transform space through the use of an appropriate forward transform operation, e.g., using the forward Blocked Discrete Cosine Transform (BDCT), together with motion compensation. The choice of the forward transform operation used for each montage may be determined by the inverse transform operation used by the corresponding receiving codec.

The participating codecs need not all use an identical transform scheme, and may each work with digital frames that have different aspect ratios and different pixel counts in the horizontal and the vertical directions. Accordingly, the present invention will permit the interconnection of sites that employ different types of codecs, e.g., motion-JPEG, MPEG, or H.261-based codecs.

According to the present invention, it is also possible in a multipoint conference to include sites that do not have codecs, but transmit and receive analog and digital video images without any type of compression. Alternately one or more sites may have codecs that perform only entropy coding and decoding, without doing transform-based noisy compression or transform-based decompression.

Still another object of the present invention is to provide a versatile multipoint composition and bridging system that reduces delay and hardware requirements by composing and bridging video signals directly in the transform domain.

The present invention is therefore directed to a versatile multipoint bridging system or method, or one or more sub-systems or sub-methods thereof, for bridging a plurality of users located at different terminal end locations of a communication network. Each of the locations include terminal equipment for transmitting and receiving video images and data signals, where the data signals include display configuration information for video images that are originating from one or more of the different terminal end locations. The video images and the data signals are received from each of the locations, and respective video montages are generated for each of the locations based upon the data signals received. In this regard, the received video images are selectively resized based upon the data signals, and the resized video images are montaged in order to produce the montage images based upon the data signals. The video montages that were generated are then transmitted to the locations so that they may be displayed by a display device provided at each of the locations.

The resizing of the incoming video images may be performed by selectively resizing the video images while the video images are represented in signal space, or in the alternative, while they are represented in transform space.

A mechanism may be provided for inputting display configuration information which defines the montage displayed by a display device provided at each of the locations. In this regard, the display configuration information may comprise information regarding the position, the relative width, and/or the size, on the display device, of a display window provided for each video montage. The display configuration information may also comprise information regarding the zoom and pan settings for each display window.

In accordance with a further aspect of the invention, the terminal equipment may be provided with one or more devices for capturing video and audio teleconferencing information for transmitting such information to other locations.

Further, the present invention may mix still images and conferencing props, such as electronic white-boards, computer screens, or slides, together with video in the montages that are created. The incoming still-images and props may be coded in accordance with a compression standard, such as JPEG, or may be input in a digital signal space form. In addition, video, still image, and prop windows may be circumscribed by borders, and may display associated soft-controls, icons, and annotations.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE ILLUSTRATED EMBODIMENTS

Figure 1:
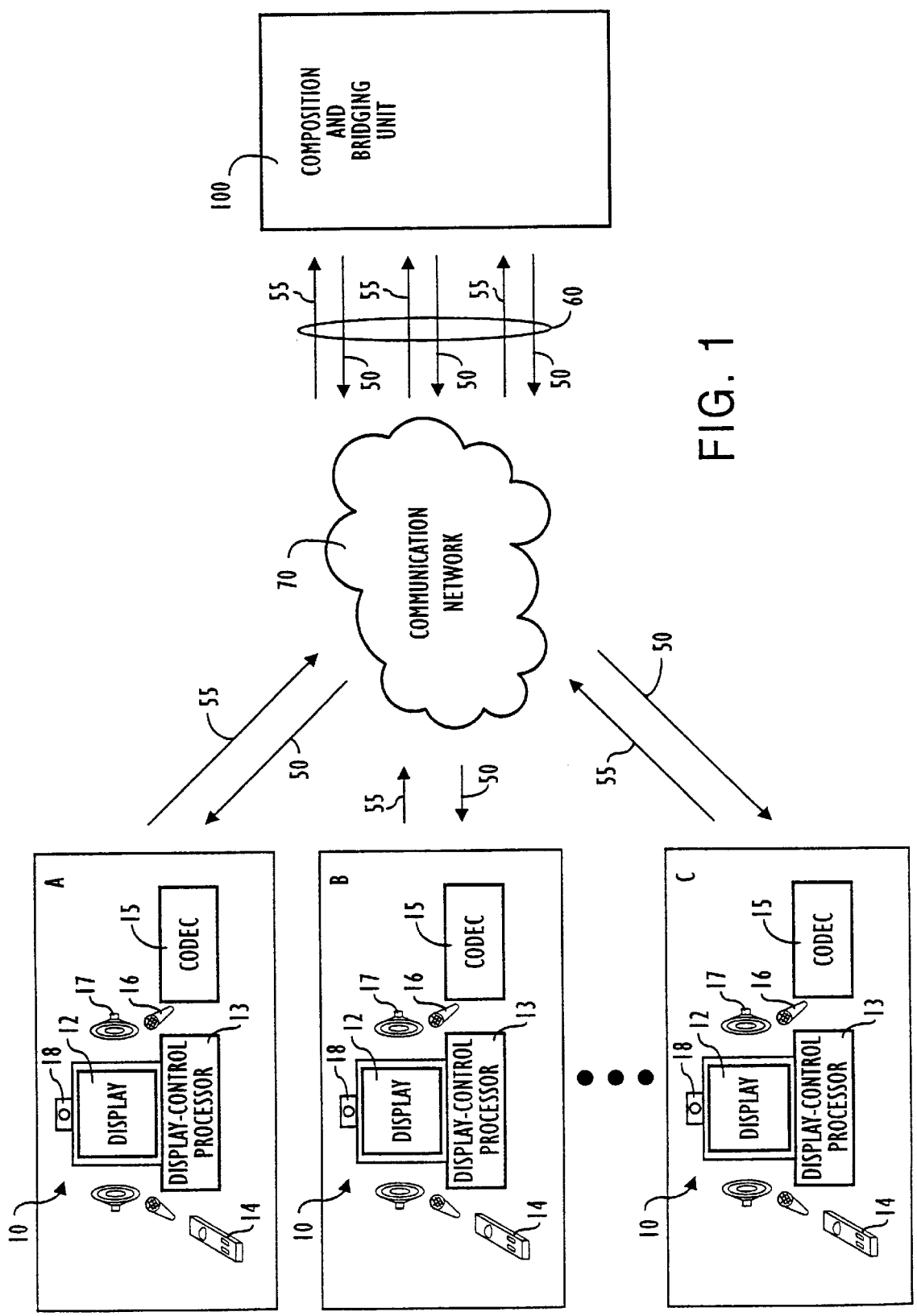
FIG. 1 is a general illustration of a flexible multipoint system for video signal composition and bridging.

Referring now to FIG. 1, a general description of an exemplary embodiment flexible multipoint system for video signal composition and bridging will now be provided.

As shown in FIG. 1, a plurality of remote locations A–C (only three have been shown for the purposes of illustration) may be provided that are connected to a versatile multipoint composition and bridging unit 100 across a communication network 70. Each of the remote locations includes terminal equipment 10 that is connected to communication network 70 by communication links 50 and 55. Each terminal equipment 10 may include a display device 12 and a display-control processor 13 for displaying video images, an input device 14, which may comprise, for example, a point-select-and-drag device, a remote control unit, a keyboard and/or mouse, for inputting data and control commands, and microphones 16 and speakers 17 for transmitting and receiving audio signals. Further, a video camera device 18 may be provided for gathering a video image for transmission to a remote location. Video camera device 18 may generate analog National Television Standards Committee (NTSC), Phase Alternating-Line (PAL), or Sequential Coloeur Avec Memoire (SECAM) images and may include analog/digital converting means (not shown) for converting the analog NTSC, PAL, or SECAM images into digital images suitable for transmission. In addition, or in the alternative, a video camera device 18 may be adapted to directly generate a digital video signal.

Each terminal equipment 10 may also include a codec 15 (i.e., a coding and decoding device) for source and channel coding and decoding, and a substream separator and integrator (not shown) for separating and integrating the video, audio and data substreams transmitted and received by terminal equipment 10. At each terminal equipment 10, codec 15 may be omitted such that analog or digital video are directly transmitted and/or received in a raw uncompressed state, or in a digital form that has been entropy encoded.

It is noted that a number of companies manufacture video codecs that conform to the standard H.261. Such companies include NEC, AT&T, GPT, Compression Labs, Inc., PictureTel, and Vtel. The NEC codec is designated as NEC TC500. The AT&T codec is designated S4000. Compression Labs manufactures Rembrandt. PictureTel makes model system 1000 and system 4000. Vtel makes MediaMax386.

Display-control processor 13 may receive pointing and selection signals from input device 14 and generate the position, sizing, occlusion, zoom, and pan data to be sent from terminal equipment 10 to bridging unit 100. Based on this data, bridging unit 100 may produce a video montage to be displayed at the remote location. Display-control processor 13 may receive a digital video montage in signal space from codec 15, and overlay window frames, cursor, and icons. With respect to outgoing video, display-control processor 13 may be adapted to perform the necessary analog-to-digital conversion on each frame and output a sequence of video frames in the signal space to codec 15.

In addition, terminal equipment may include a memory device (not shown) for storing still video images or other data for transmission and display at other remote locations.

The composition and bridging unit 100 may be located at a central location in communication network 70, as shown in FIG. 1, with each of the remote locations A–C being geographically dispersed at terminal end locations of the communication network 70. Bridging unit 100 may be connected to communication network 70 by a plurality of communication links 60, that include a pair of communications links 50 and 55 for each remote location. Communication links 50 and 55 carry signal streams to and from each terminal equipment 10 and bridging unit 100. Each signal stream may include a video substream, an audio substream, and a data substream. Although FIG. 1 depicts two separate communication links 50 and 55 for carrying these signal streams, a single two-way communication link may also be used for interconnecting each terminal equipment 10 to communication network 70. Communication links 50 and 55 may, e.g., comprise one or more transmission links for transmitting signals from one point to another, with transmission media such as two-wire open lines, twisted pair lines, coaxial cable, optical fibers, satellite systems, terrestrial microwave links, and so on. The links may be in the form of multiple channel links for transmitting TDM signals, such as, e.g., DS1, or DS3-rate communication links; fractional DS1 or fractional DS3-rate communication links; SONET links; or ATM links. In addition, links 50 and 55 may comprise local connections in a LAN environment.

In view of the large bandwidth of the connection between bridging unit 100 and communication network 70, it is more advantageous to place bridging unit 100 at some central location in communication network 70. The bridging unit 100 may also be connected to communication network 70 through a single bi-directional link (not shown), having a bandwidth that is greater or equal to the aggregate bandwidth of all the communication links 50 and 55 connected to network 70 from each of the remote locations.

As described in more detail below, bridging unit 100 serves as a video bridge for each of the remote locations A–C during, for example, a video teleconference. The bridging unit 100 receives each of the incoming signal streams from the remote locations along communication links 55. These incoming signals are channel-decoded by the bridging unit 100 and then are separated into the three component signal substreams (i.e., the video substream, audio substream, and data substream). Based on the data substreams from a given location, bridging unit 100 resizes, cuts and pastes the various video images into a composite or montage for display at that location. A video conference attendant, for example, at one of the remote locations may input data via input device 14, so as to optionally display video images from one or more other locations within separate display windows at a particular terminal or set of terminals. The display windows may be displayed in arbitrary formats, and may be zoomed, panned, scaled, translated and/or partially or wholly occluded based on the data substreams received from the user's location. Once the various montages have been developed for each of the locations, bridging unit 100 integrates the video montages with the mixed and/or switched audio signals, and then channel codes the various integrated signal streams before they are delivered to the remote locations via communication links 50.

Figure 2:
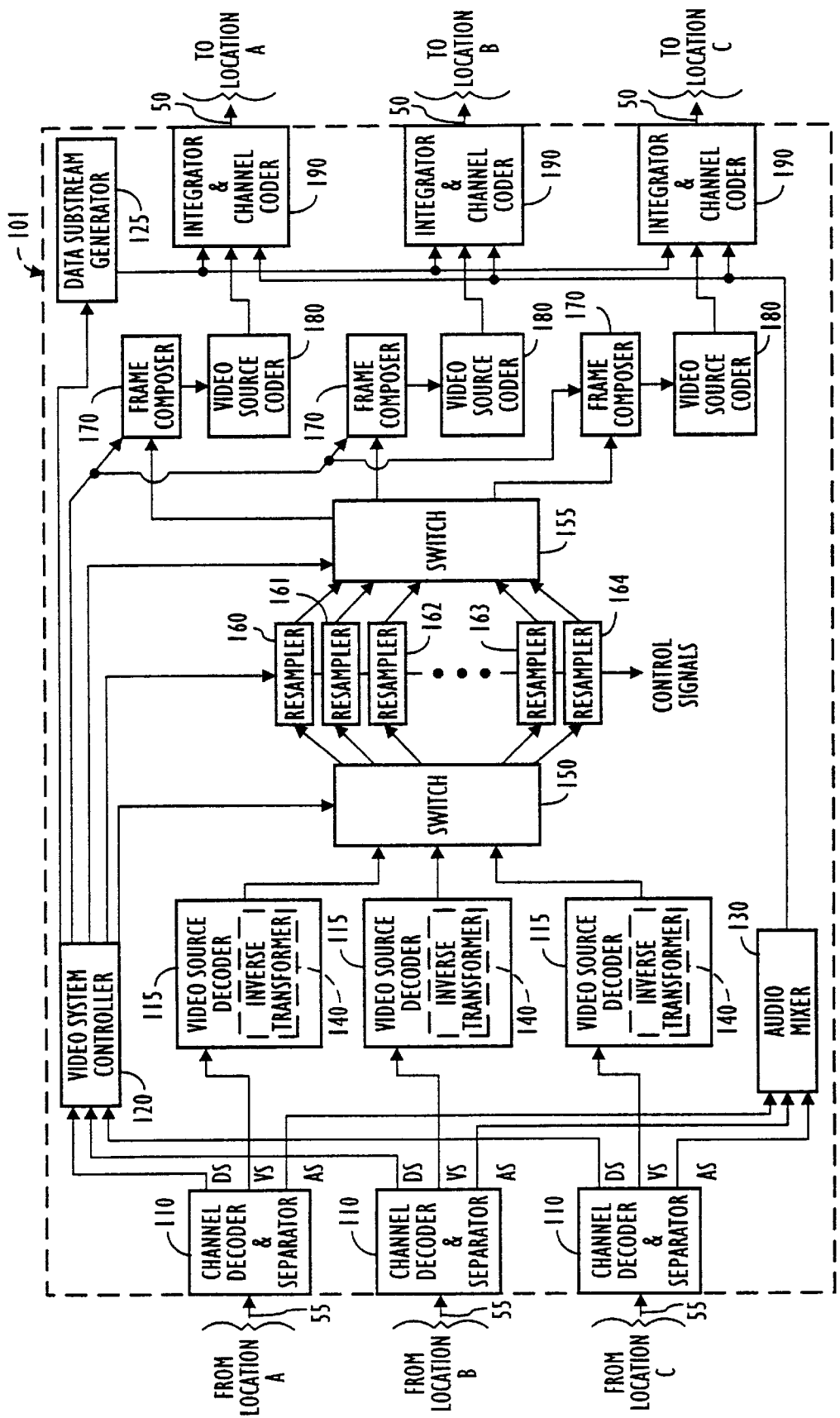
FIG. 2 is a block diagram of a first illustrated embodiment of a multipoint control unit.
Figure 5:
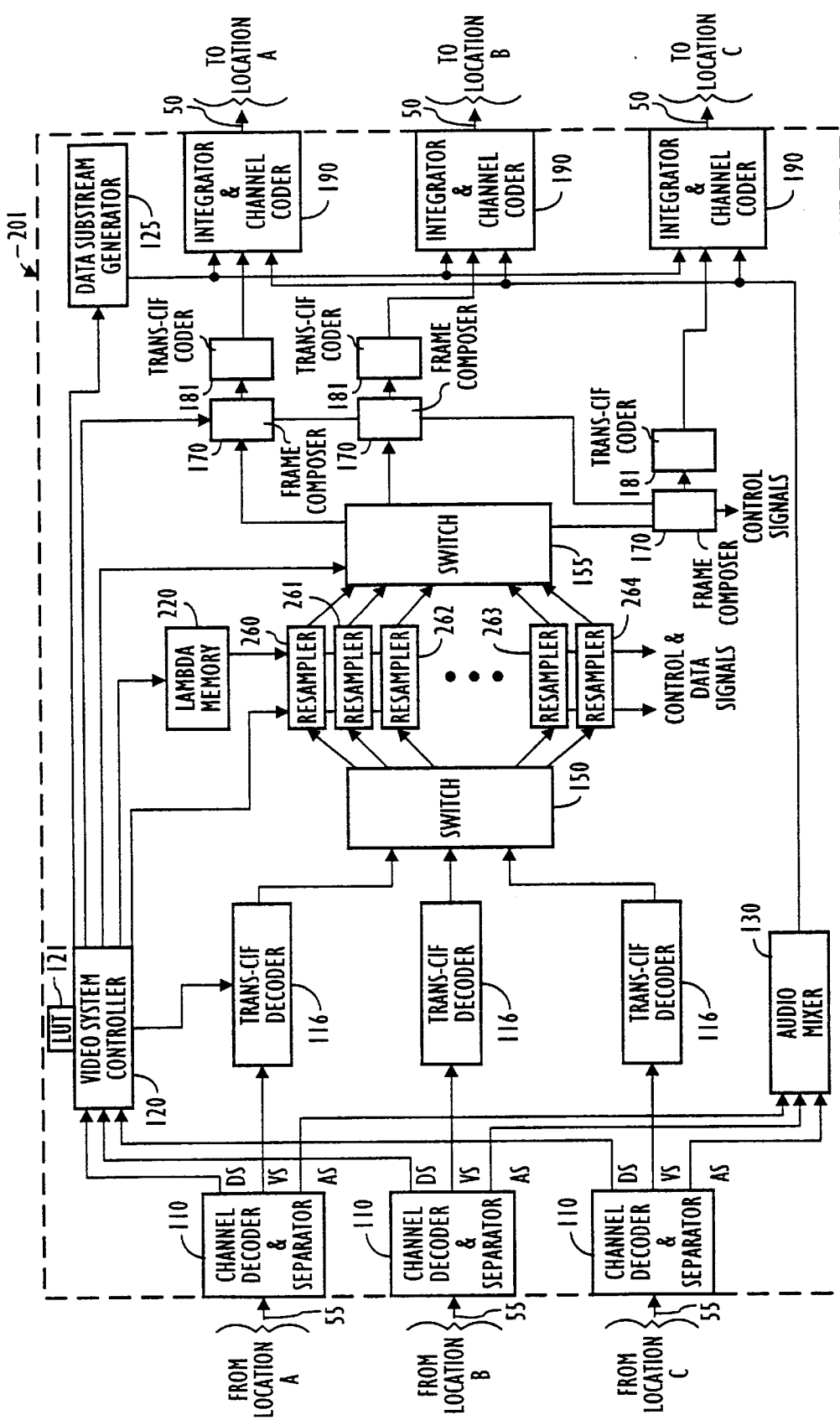
FIG. 5 is a block diagram of a second illustrated embodiment of a multipoint composition and bridging system.

A more detailed description of the specific flexible multipoint bridging units illustrated herein will be provided hereinafter. A first illustrated example embodiment of the present invention includes a versatile multipoint composition and bridging unit which performs video signal composition and bridging in signal space (i.e., in the signal domain), and may be implemented as shown in FIG. 2. A second illustrated embodiment includes a versatile multipoint bridging unit that performs video signal composition and bridging in transform space (i.e., in the transform domain), and may be implemented as shown in FIG. 5.

FIG. 2 shows a block diagram of a first illustrated embodiment multipoint bridging unit 101 that performs video signal composition and bridging in the signal domain. For purposes of illustration, FIG. 2 shows bridging unit 101 serving as a video bridge for only three remote locations (i.e., remote locations A, B and C) with an incoming communication link 55 from each of these locations connected to the bridging unit on the left-hand side of the figure, and an outgoing communication link 50 to each of these locations being connected to the bridging unit on the right-hand side of the figure. In general, however, any arrangement and number of remote locations could be connected to bridging unit 101, with separate incoming and outgoing communication links or a single two-way communication link for each of the remote locations, to transmit the various signal streams. A single physical link may even be used to carry each of links 50 and 55.

Each of remote locations A, B, and C transmits a signal stream, which includes a video substream, an audio substream and a data substream, to bridging unit 101 via a communication link 55. In the specifically illustrated embodiment, the frame structure of the signal stream may comply with ITU-T recommendations H.221, H.230, H.242, and H.261, although other formats could be used for the signal stream in the present invention. Communication links 55 may be full or fractional DS1 or DS3-rate links, SONET links, ATM links, or other suitable links.

In the illustrated embodiment shown in FIG. 2, each communication link 55 is connected to a channel decoder and separator device 110 of bridging unit 101. Each of the decoder and separator devices 110 receives various incoming signal streams from the remote locations and performs channel decoding on the signal streams. Then it separates the video, audio, and data substreams. Device 110 may, for example, include a T1 decoder and a signal substream separator. Further, the decoder and separator device 110 may comply with the applicable ITU-T recommendations.

The separated incoming audio substreams (AS) are fed to an audio mixer 130. Audio mixer 130 generates different outgoing audio substreams for each of the remote locations A, B and C. For example, an audio substream destined for one of the locations could consist of the sum of the incoming audio signals from the other remote locations; in other words, the audio substream to be sent to remote location A could consist of the sum of the incoming audio signals from locations B and C. In addition, the audio signals could be switched, rather than summed, if the summed noise is excessive or overwhelming. In FIG. 2, only one single audio substream is shown as being outputted from audio mixer 130 for purposes of illustration. In practice, audio mixer 130 may output an audio signal for each of the remote locations A, B and C. Further, audio mixer 130 includes means (not shown) for handling all source decoding and coding requirements of the audio signals.

The separated incoming data substreams (DS), outputted from each channel decoder and separator 110, are inputted to a video system controller 120. The data substreams may include data or commands which indicate how a user or participant at each remote location would like to configure its video display. These commands are interpreted by controller 120, which sends the appropriate data and control signals to switches 150 and 155, to resamplers 160–164, and to frame composers 170, which are described in greater detail below. The incoming data streams (DS) may include other information, not related to the display configuration, that is transmitted to some or all of the other remote locations. For this purpose, a data substream generator 125 may be provided to generate an outgoing data substream for each of the remote locations A, B and C. Similar to audio mixer 130, data substream generator 125 is shown with only a single data substream issuing therefrom, in order to simplify the illustration in FIG. 2.

In the embodiment illustrated in FIG. 2, each of the separated video substreams (VS), outputted from each channel decoder and separator 110, is inputted into a respective video source decoder 115. The incoming video substreams are decoded to undo the source coding. Source coding generally consists of compression and compaction coding and motion compensation. The source decoding performed by video source decoder 115 may include Huffman decoding, or another type of entropy decoding, to undo the compaction coding. The other parts of source decoding, i.e., compression decoding and inverse motion compensation, involve the inverse transformer 140 within the video source decoder 115. The inverse transformer 140 is discussed in detail below. Further, video source decoder 115 may perform source decoding which complies with ITU-T recommendation H.261 or with International Standards Organization's (ISO's) Motion Pictures Experts Group (MPEG) standard. For information on the H.261 standard see, for example, American National Standards Institute, "ANSI T1.314-1991: Digital Processing of Video Signals—Video Coder/Decoder for Audiovisual Services at 56 to 1536 Kbits/s," ANSI, New York, 1991, the disclosure of which is expressly incorporated herein by reference in its entirety.

The type of video source decoder 115 that is used for each incoming signal may depend upon the source coding method used by the corresponding transmitting codec 15 at the remote location. An appropriate choice of the channel decoder and separator 110 and the video source decoder 115 will permit a remote location equipped with any kind of codec 15, or not equipped with a codec 15, to be connected to bridging unit 101, such that a signal representation is obtained at the output of the corresponding video source decoder 115.

As a result of the source decoding and inverse motion compensation performed by video source decoder 115, a CIF (Common Intermediate Format) image may be recovered in the case of a H.261 codec, or a SIF (Standard Input Format) image may be recovered in the case of a MPEG codec, or another type of digital picture format may be recovered. The CIF and SIF formats are a digital frame formats that are based upon the CCIR Recommendation 601. CCIR 601 recommends that a frame in the signal space be represented by a collection of three separate matrices: Y, Cr, and Cb. The Y or the luminance matrix encodes the black and white information. The Cr and Cb or color difference matrices encode the color information. The CIF representation allows video coder/decoder standards to apply worldwide, and allows teleconferencing across national boundaries. Accordingly, video source decoder 115 may accept NTSC, PAL, or SECAM source based signals.

The video source decoder 115 includes inverse transformer 140. The transformation of the image frame from the transform space to the signal space is performed by separating the image frame into blocks that are eight pixels wide by eight pixels deep, and then computing the Inverse Discrete Cosine Transform ($DCT^{-1}$) for each block. The process of dividing the image frame into blocks, followed by the $DCT^{-1}$ operation on each block, is referred to as the inverse Blocked Discrete Cosine Transform (BDCT$^{-1}$) hereinafter. The Discrete Cosine Transform (DCT) for $R^N$ is defined by the orthonormal basis $$\{\phi_r^N\}_{r \in Z_N}: \phi_r^N(n) = C_r\cos(2n+1)\pi r/2N,$$

where $$C_r = \begin{cases} N^{-1/2}, & n = 0 \\ (2/N)^{1/2}, & n \neq 0 \end{cases}$$

The Blocked DCT (BDCT) basis $$\{\phi_r^N\}_{r \in Z_N}$$

for $R^N$, for any $N \in Z^+$ and block-size $B \in Z^+$, is defined in terms of the DCT basis set $$\{\phi_r^B\}_{r \in Z_B}$$

for $R^B$:

$$\phi_r^N(n) = \begin{cases} \phi_{r \bmod B}^B(n - r + r + r_B), & (r - r_B) \leq n < (r + B - r_B) \\ 0, & \text{otherwise} \end{cases}$$

In the above equation, "r mod B" is written as "$r_B$" for brevity. In addition, the above equations apply for one-dimensional signals. Thus, in the case of two-dimensional images, these equations would have to be applied separately along the rows and columns of each image. Further, the still image and video coding standards JPEG, MPEG and H.261 are all based on the BDCT with a block-size B of eight. The basis for BDCT$^{-1}$ may be derived and deduced from the BDCT basis described above.

The video source decoder 115 may produce a succession of CIF frames in the signal space. The CIF format is a digital frame format in which the Y matrix is specified to be 352 columns wide by 288 rows deep. The Cr and the Cb matrices are specified to have half as many columns and half as many rows. For a more detailed description of the CIF format, see, for example, American National Standards Institute, "ANSI T1.314-1991: Digital Processing of Video Signals—Video Coder/Decoder for Audiovisual Services at 56 to 1536 Kbits/s," ANSI, New York, 1991.

It is noted that video source decoder 115 and inverse transformer 140 may be configured so as to recover trans-Quarter CIF (QCIF) and QCIF frames in addition to or instead of trans-CIF and CIF image frames. Standard H.261 defines QCIF images as having half the number of pixels, in both the horizontal and vertical directions, as compared to CIF images. As will be appreciated by those of ordinary skill in the art, the present invention could handle any combination of CIF and QCIF images.

Video source decoder 115 outputs luminance and color difference matrices that constitute a signal space frame representation (e.g., the CIF, QCIF, or SIF representation). The signal space frame representation is the frame representation in signal space that the transmitting codec 15 at a remote location started out with, together with noise or perturbation that is added by the quantization and motion compensation processes. The image frames that are provided in the signal space from video source decoders 115 can be resized using fractional resampling along the rows and columns of the luminance and color-difference matrices. For example, a frame image from location A may need to be resized to a number of different sizes such that the resized frames satisfy the size requirements of all the destination displays. In FIG. 2, resizing is performed by resamplers 160–164. Each of the resamplers 160–164 produces a single resized image at its output. Although FIG. 2 only shows five resamplers, more than (or less than) five resamplers may be provided. More resamplers would provide a greater degree of freedom in resizing (by allowing users to choose among more than five different sizes for windowed displays).

Once all of the various incoming frames have been resized, they may be composed to produce CIF frames for display at each of the remote locations. In FIG. 2, the video composition of the final outgoing frames is performed by frame composers 170. Resamplers 160–164 and frame composers 170, as well as switches 150 and 155, are all controlled based on the control signals from video system controller 120. As noted above, video system controller 120 interprets the data substreams from each remote location. These data streams indicate how and what images should be composed and displayed at each user's location.

The illustrated embodiment may be configured so that a user or participant at each remote location may instruct bridging unit 101 to generate a video montage for display at their display device 12 in a desired fashion, by specifying a set of four numbers $X_i$, $Y_i$, $Z_i$, and $S_i$, for each of the images from the participating locations. These numbers may be inputted by a user through an appropriate user interface (e.g., a graphical user interface—not shown) using input device 14 which, as discussed above, may consist of a keyboard and/or mouse device. The numbers $X_i$ and $Y_i$ give the position of the top left corner of a video originating from remote location $L_i$, and the number $Z_i$ indicates the relative depth of the display window for remote location $L_i$ with respect to the other display windows. $S_i$ indicates the size of the display window for the image originating at location $L_i$. $S_i$ may give the window-length in units of pixels, for example; and, the number of pixels down the window could be derived based on the window-length and the aspect ratio.

Figure 3:
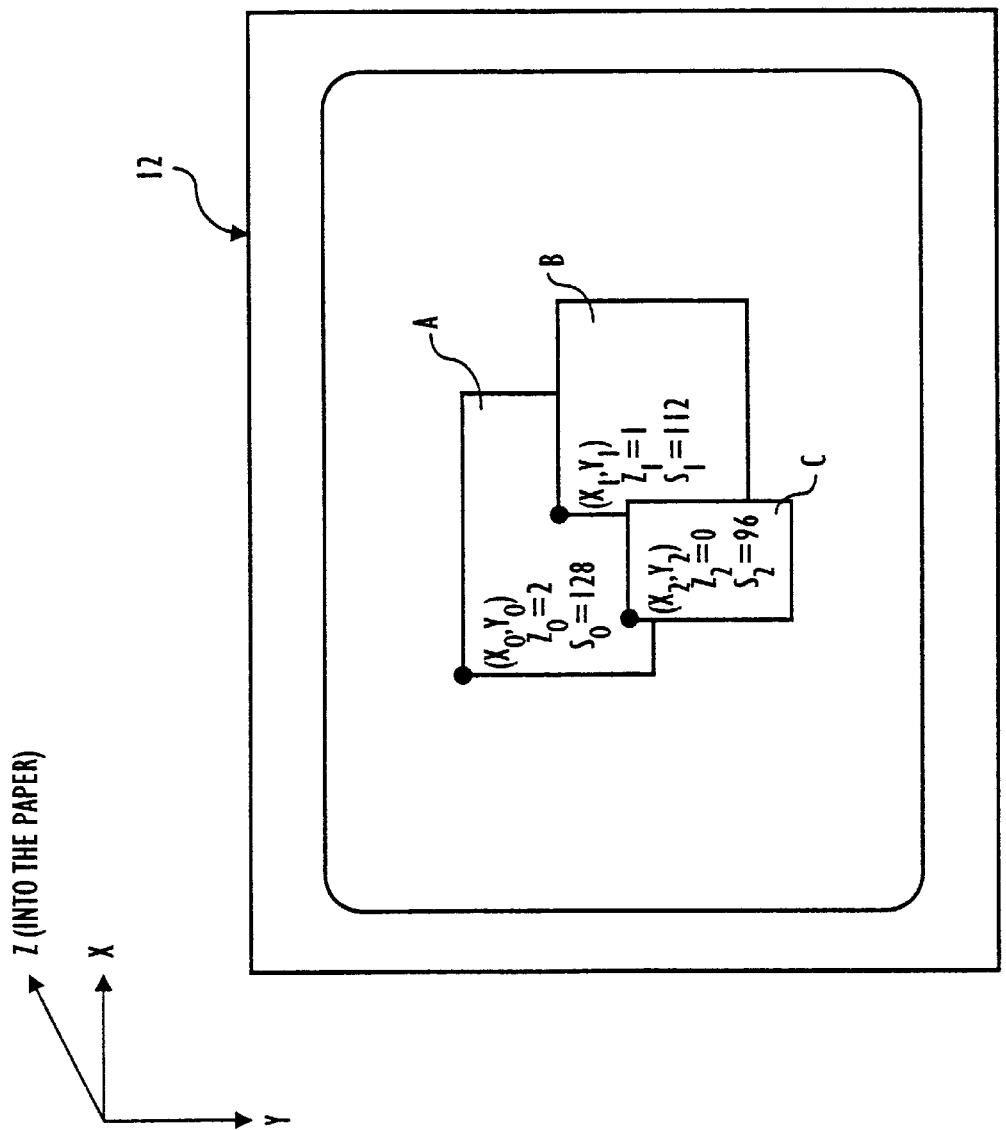
FIG. 3 shows an example window display organization for a display device.

FIG. 3 shows an example of a window display organization for display screen 12. In FIG. 3, it is assumed that there are three participating conferencing locations $L_0$–$L_2$, and that X corresponds to a coordinate along the horizontal axis, Y corresponds to a coordinate along the vertical axis, and that Z corresponds to relative depth based upon a coordinate along an axis which is orthogonal to the horizontal and vertical axes, and which goes into the sheet of the drawing (which is into the screen of the display). Each of the display windows in FIG. 3 is assigned a unique Z coordinate, and the relative depth of each of the display windows determines which display windows are partially or wholly occluded.

In accordance with another aspect of the present invention, $S_i$ may correspond to a scaling factor for determining the size of each of the display windows. In such a case, a window may be displayed at $X^{-S}$ times the full-screen size, where X and S are integer values. For example, the display windows may be scaled by factors of the powers of X=2, such that when the size of number S is increased, the size of the window displayed on the screen is decreased. Of course, other scaling conventions and other meanings of the scaling factor $S_i$ can be used, e.g., in order to provide more flexibility in the resizing of the display windows. For example, the windows could be scaled and displayed at $3^{-s}$ or $4^{-s}$ times that of a full-screen size, or S could be a real number with the windows being scaled and displayed at S times the full-screen size.

Referring now back to FIG. 2, based on the various sets of numbers $X_i$, $Y_i$, $Z_i$, and $S_i$ that are provided in the data substreams from each of the locations, video system controller 120 sends the appropriate control signals to switches 150 and 155, resamplers 160–164 and frame composers 170.

These control signals control the various components in bridging unit 101 so that an incoming frame image from, for example, location A, is distributed by switch 150 to none or one or more of the resamplers 160–164, depending upon how many different sizes of the video images from a given location are requested by the other locations. Each of the resamplers 160–164 produces a single sized image at its output that is distributed to the various frame composers 170 by switch 155 based on the various video images and sizes to be composed at each of the frame composers 170. Frame composers 170 receive the various resized images and composes them into new Y-Cr-Cb arrays, one set per participating location, where each set carries the composite montage of images requested by each location.

The montages are outputted from frame composers 170 to video source coders 180, as shown in FIG. 2. Video source coders 180 perform transformation, quantization, entropy coding, and motion compensation. Transformation may be based on the BDCT, which is described above with respect to inverse transformer 140. The resultant source-coded image is then input to an integrator and channel coder 190, as illustrated in FIG. 2. The resultant video substream is then integrated with the audio and data substreams and, thereafter, channel coded (to produce, for example a T1 signal stream) by integrator and channel coder 190 for transmission to one or more of the remote locations A, B, and C. As shown in FIG. 2, the resulting signal streams may be transmitted to locations A, B, and C via outgoing communication links 50.

Figure 4:
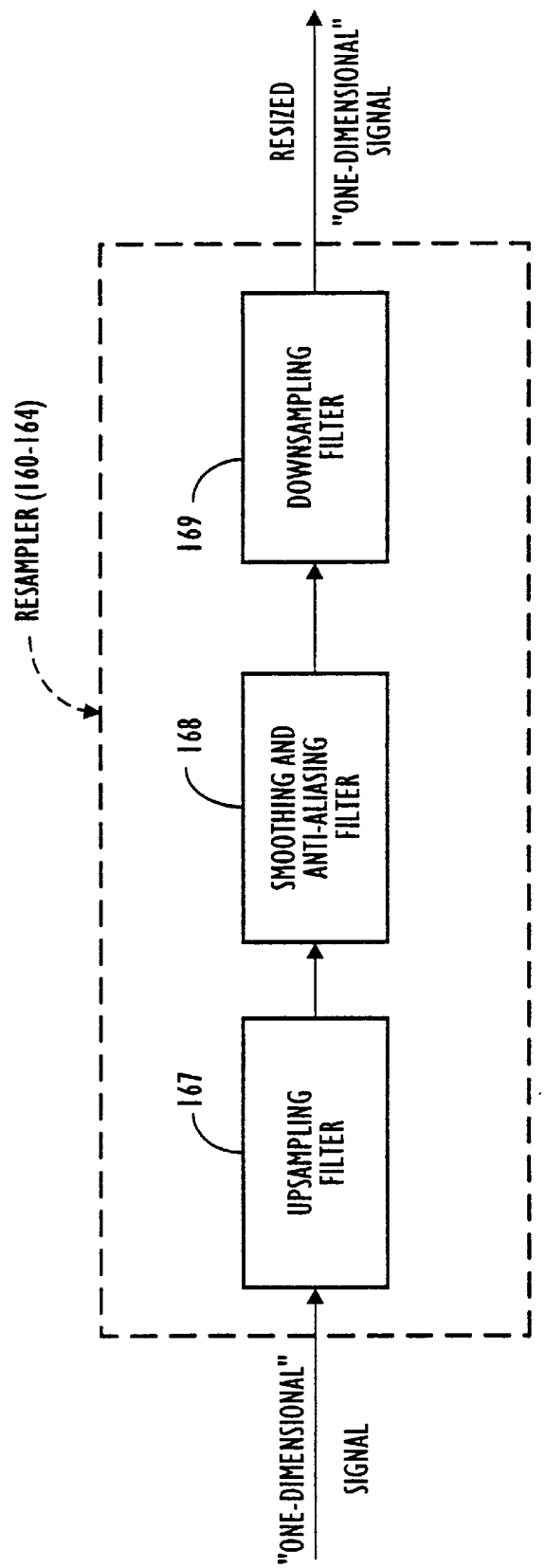
FIG. 4 shows an implementation of a resampling circuit.

In FIG. 4, an exemplary embodiment of a "one-dimensional" resampling circuit of resamplers 160–164 is illustrated. Each of the resamplers 160–164 may include two identical "one-dimensional" resampling circuits that are connected in tandem, wherein one of the resampling circuits scales along the x (horizontal) axis and the other resampling circuit scales along the y (vertical) axis. For the purposes of illustration, an example of one of the resampling circuits that may be used in resamplers 160–164 is shown in FIG. 4.

A "one-dimensional" discrete-time signal can be resized, with minimal loss in quality, through the use of a digital fractional-resampling system, such as that illustrated in FIG. 4. As shown in FIG. 4, such a system may include an upsampling filter 167, followed by a smoothing and anti-aliasing filter 168, and then followed by a downsampling filter 169. For a further description of such filters, see, for example, P. P. Vaidyanathan, "Multirate Systems and Filter Banks," Prentice Hall, Englewood Cliffs, N.J., 1993, or A. V. Oppenheim and R. W. Schafer, "Discrete-Time Signal Processing," Prentice Hall, Englewood Cliffs, N.J., 1989, the disclosures of which are expressly incorporated herein by reference in their entirety.

FIG. 4 shows the logical arrangement of the filters 167–169. This arrangement, however, could be further simplified in a physical realization. The arrangement of these digital filters 167–169 allows signal size reduction or increase, in principle, by any rational factor. However, if the rational factor in its reduced form has large integers in the numerator and the denominator, then a different method that uses polynomial fitting and filtering may be used, which is more cost-effective. In this regard, reference can be made to T. A. Ramstad, "Digital Methods for Conversion Between Arbitrary Sampling Frequencies," IEEE Trans. ASSP, Vol. ASSP-32, pp. 577–591 (June 1984), the content of which is expressly incorporated by reference herein in its entirety. If the numerator or denominator are highly-composite numbers with small factors, resampling can also be done with a cascaded arrangement of filters where each filter upsamples or downsamples by a component factor (see, e.g., P. P. Vaidyanathan, "Multirate Systems and Filter Banks," Prentice Hall, Englewood Cliffs, N.J., 1993, noted above). As noted above, the resizing of the display windows may be performed in accordance with $S_i$ representing a scaling factor, and based on the various powers of X ($X^{-S}$), where X is an integer. For example, X may be set to 2, so that scaling is performed based on the various powers of two ($2^{-S}$). This type of resizing arrangement provides certain simplicity in terms of avoiding upsampling and fractional-sampling digital filter structures (see, e.g., page 109 in the P. P. Vaidyanathan reference noted above). If reduction by integral factors only is performed by resamplers 160–164, then the upsampling filter 167 can be omitted.

The smoothing and anti-aliasing filter 168 can be designed using a number of different methods. For example, anti-aliasing filter 168 may be designed through the use of a truncated sinc window, or the use of the product of a truncated sinc window with a smooth but rapidly decaying function (e.g., similar to a Kaiser window; see, e.g., the P. P. Vaidyanathan and A. V. Oppenheim et al. reference noted above), which improves side-lobe suppression from 21 to 40 db over the truncated sinc. In addition, the anti-aliasing filter 168 may be designed through the use of wavelets, such as those described in M. Frazier and A. Kumar, "Introduction to the Orthonormal Wavelet Transform or Discrete Sets," pages 51–95 in Benedetto and Frazier (eds.) in the book "Wavelets: Mathematics and Applications," published by CRC Press, New York, 1993, the disclosure of which is expressly incorporated herein by reference in its entirety.

Zooming and panning may be accomplished by resizing a suitable segment of the signal space image, instead of resizing the entire image.

As described in detail above, bridging unit 101 of FIG. 2 performs video signal composition and bridging in the signal domain (i.e., signal space) and entirely in the digital domain. Since video images are frequently transmitted in the transform space rather than the signal space (according, for example, to video compression methods used in motion-JPEG, H.261 and MPEG), the bridging unit 101 of FIG. 2 calculates the inverse and forward transforms (based on the BDCT) of the incoming video substreams during source-decoding and source-coding. As an alternative, the present invention may perform video composition and bridging directly in the transform space, so as to avoid the need for the computation of the inverse and forward transforms. Such an approach reduces delay and hardware requirements, and is advantageous where video images are transmitted in the transform space.

Referring now to FIG. 5, a description of a second embodiment of a bridging unit, i.e., of an example flexible multipoint bridging unit 201, which performs video signal composition and bridging directly in the transform space, will be described.

FIG. 5 shows a block diagram of a multipoint bridging unit 201 for bridging a plurality of locations during, for example, a video conference. While FIG. 5 only shows three geographically dispersed locations A, B, and C, more than three locations may be bridged by bridging unit 201. The block diagram of FIG. 5 is similar to that of FIG. 2, except that the video source decoder 115 and the video source coder 180 have been replaced by a trans-CIF decoder 116 and a trans-CIF coder 181, respectively, and a lookup table 121 and a Lambda memory 220 have been included. The following description generally discusses only the differences of FIG. 5 from that of FIG. 2; a detailed description of the various elements and parts in FIG. 5 that are similar to that in FIG. 2 (e.g., channel decoder 110, integrator and channel coder 190, etc.) has been provided above with respect to FIG. 2.

In FIG. 5, bridging unit 201 composites (e.g., by resizing, zooming, panning, cutting and pasting) the various video signals directly in the transform space or domain. The trans-CIF decoder 116 receives a succession of video frames in which blocks of the Y, Cr, and Cb matrices have been transformed following motion compensation, and converts those matrices to a "trans-CIF" representation in which the effects of entropy encoding and motion-compensation have been undone, but the image remains in the transform domain. Thus, the output of the trans-CIF decoder 116, defined to be the trans-CIF image, is the transform space image (e.g., the BDCT image, in the case the transmitting codec uses H.261 or MPEG) of the signal space representation of the matrices Y, Cr, and Cb. In the case the transmitting codec uses motion-JPEG, no motion compensation is performed by the transmitting codec, and the trans-CIF decoder 116 has no motion-compensation to undo. Effects of motion compensation can be removed by using the displacement vector information.

The resized transform space frame (a collection of the Y, Cr, and Cb matrices) may be calculated by resamplers 260–264 through interpolation, by the use of digital filters connected in tandem, or based on a matrix multiplication of the vectors of the transform space representation of an incoming frame with certain matrices stored in a Lambda memory 220. A detailed description of a theorem, which explains how a resized transform space frame can be calculated from the transform space representation of an incoming frame, is provided below. In addition, a description of the design considerations for the digital filters connected in tandem will be provided below with reference to FIG. 6.

The matrix multiplication may be performed by resamplers 260–264, which may be configured to multiply the incoming row and column vectors of a frame image (either Y, Cr, or Cb) with the appropriate matrices stored in Lambda memory 220. The matrices stored in Lambda memory 220 are selected and sent to resamplers 260–264 based on the data $S_i$ received in the data substreams. For this purpose, video system controller 120 may include a Look-Up Table (LUT) 121, that is implemented by a suitable memory storing device (e.g., a RAM). In such a case, size parameters $S_i$ may be used as indices to LUT 121 to get addresses which point to the appropriate matrices stored in Lambda memory 220. The located matrices could then be output from Lambda memory 220 to one or more of the resamplers 260–264. Lambda memory 220 may be implemented using any one of various storage mediums, such as DRAM or a magnetic disk. A specific illustrated example embodiment of resamplers 260–264 for performing the above-noted matrix multiplication is described below with reference to FIGS. 7 and 8.

Each resized transform space frame from resamplers 260–264 in FIG. 5 is selectively distributed by switch 155 to one or more frame composers 170, based on the data commands and selected video images to be displayed at each of the remote locations A, B, and C. With the images of a frame being directly provided in the transform space, frame composers 170 would pick and place blocks in different component image frames based on the control signals from video system controller 120 in order to output the resultant video montages. The trans-CIF coders 181 may perform motion compensation and entropy coding on the outgoing video streams directly in the transform space. In general, the trans-CIF coders 181 may complete source coding in such a way as to make the outgoing video stream compatible with the corresponding receiving codec. The integration and channel coding of the signal substreams and the operation of integrator and channel coders 190 in FIG. 5 are similar to that in FIG. 2, and will thus not be described in detail again herein.

Resamplers 260–264 in FIG. 5 may be implemented through the concatenation of two "one-dimensional" scaling circuits, including one that operates or resizes along the x (horizontal) axis and the other which resizes along the y (vertical) axis. As such, each of the resamplers 260–264 may receive two matrices from Lambda memory 220 when resizing an image from one of the locations. This is necessary since a frame in the video sequence is actually a "two-dimensional" signal, and since scaling needs to be done both along the x and y axes.

More particularly, the embodiment illustrated in FIG. 5 may be implemented in accordance with the following additional details. In the description that follows, a Notation section will be provided to discuss the notation used in the following description, and, thereafter, a Frame Composition Problem (FCP) section will be provided for describing the challenges of composing frame images provided in the transform space. Further, a Scaling in the Transform Space section is provided in which a theorem that gives a solution to the problem of scaling or resampling in the transform domain is discussed. In addition, with reference to FIG. 6, the constraints, shape and level of a filter h that could be used for smoothing and anti-aliasing performed by resamplers 260–264 will be provided below in separate sections (i.e., Constraints on the Support of the Filter h; The Shape of the Filter h; and, The Level of the Filter h).

1. Notation

C, R, Z, and $Z^+$ respectively represent the set of complex numbers, the set of real numbers, the set of integers (positive, negative, and zero), and the set of positive integers. If a∈C, then $\bar{a}$ is its complex conjugate. The ceiling function $\lceil \cdot \rceil$: R→Z maps a real number to the smallest integer greater than or equal to the given real number. The floor function $\lfloor \cdot \rfloor$: R→Z maps a real number to the largest integer less than or equal to the given real. The function $[\cdot]$: R→Z is the rounding function. For r∈R, $[r]=\lfloor r \rfloor$ if $r-\lfloor r \rfloor<0.5$, else $[r]=\lceil r \rceil$. If a, b∈Z, then a|b means that a divides b. If a does not divide b, we write a ł b. The highest common factor (hcf) of a, b∈Z is written (a,b). For a, b∈Z; a≦b; [a, b] is the set {a, a+1, . . . , b−1, b} of all integers from a to b. $Z_N$ denotes the ring of integers {0, . . . , N−1}.

If $f$ is a function from a discrete set U to C, $f$: U→C, then the support of $f$ is defined as that subset of U where $f$ does not vanish: supp($f$)={u∈U: $f$(u)≠0}. A bar over $f$ denotes the complex conjugate function $\bar{f}$: U→C such that $\bar{f}$ (u)=$\overline{f(u)}$. For x, y∈{$f$|$f$: $Z_N$→C}, their (circular) convolution will be written as:

$$x*y; \ (x*y)(n)=\Sigma_{m \in Z_N}x(m)y(n-m), n \in Z_N.$$

The inner product operation in an inner product space H is written as $<\cdot, \cdot>_H$:H×H→C. The norm induced by this inner product is written as $\|\cdot\|_H$: H→R. For h∈H, $\|h\|^2_H$=(h, h)$_H$.

2. The Frame Composition Problem (FCP)

If the set B=

$$\{\phi_r^N: Z_N \to C\}_{r \in Z_n}, N \in Z^+,$$

is an orthogonal basis for $C^N$, then any vector x=(x(0), x(1), . . . , x(N−1))∈$C^N$ can be written as a weighted sum of vectors in $\{\phi_r^N\}_r$.

Such a sum is called a decomposition of x over B. The weights in the sum are given by the inner products of x against the various $\phi_r^N$, divided by the squared norms of the $\phi_r^N$ (see, e.g., Chapter 4 in N. Young, "An Introduction to Hilbert Space," Cambridge U. Press, Cambridge, England (1988)). Thus, the decomposition of x over B is written:

$$x(n) = \sum_{r \in Z_N} \frac{\hat{x}(r)}{\|\phi_r^N\|_{C^N}^2} \phi_r^N(n), \quad (1)$$

where $$\hat{x}(r) = <x, \phi_r^N>_{C^N} = \sum_{n \in Z_N} x(n)\overline{\phi_r^N}(n). \quad (2)$$

Equation 1 shows the decomposition of x over B. The space $C^N$ that contains the vector x will be called the signal space. The space $C^N$ that contains the vector $\hat{x}$ will be called the transform space. The mapping $T : C^N \to C^N$, such that $x \to Tx = \hat{x}$, from the signal space to the transform space is called a transform, and is defined by the choice of the orthogonal basis B. We will say that the vector $\hat{x}$ is the image of x under T, and x the pre-image of $\hat{x}$ under T.

In the following description, in order to reduce any ambiguity or confusion, some vectors, $\phi_r^N$ for example, are given superscripts that declare the dimension of the vector space in which they lie.

Let $T : C^N \to C^N$ be a transform defined by some suitable choice of basis. Let the images $Tx_0, Tx_1, \ldots, Tx_{K-1} \in C^N$ of signals $x_0, \ldots, X_{K-1} \in C^N$ be given. Also considered given are three numbers (or parameters) $PP_i \in [-(N-1), (N-1)]$, $SP_i \in Z$, and $OP_i \in Z^+$, for each $i \in Z_K$. The integer $PP_i$ will be called the position parameter of signal $x_i$; $SP_i$ the size parameter; and $OP_i$ the occlusion parameter.

The Frame Composition Problem (FCP) is defined as the problem of calculating the image $Ty \in C^N$ of a signal y from the images $Tx_i$ of signals $x_i$. The signal y is required to consist of scaled copies of the signals $x_i$, placed with their left edges at $PP_i$, with extents determined by $SP_i$. If $OP_i > OP_j$, then signal $x_i$ may occlude signal $x_j$.

A signal is indicated herein as having an indention of "one" if it consists of a sequence of samples that are thought of as being distributed along a line, such as in the case of a sampled speech waveform. A signal is indicated herein as having an indention of "two" if it consists of samples thought to be distributed over a plane, as in the case of a digital image. The word "indention" is new, and the terminology proposed herein is non-standard. Conventionally, the signals called one-indentional and two-indentional herein are said to be "one-dimensional" and "two-dimensional", respectively. The conventional terminology is misleading, or at best ambiguous, because it fails to distinguish between the dimension of the vector space in which a signal lies, and the way signal samples are distributed. Thus, the two terms will be kept distinct in the description that follows.

So far the FCP has been stated in the one-indentional form (1I-FCP hereinafter). It is easy to see that the two-indentional analog of the 1I-FCP is the problem of composing frames from transform-coded video flowing into a device that connects a number of video sources to each other, such as in a multipoint video conference system.

One way to solve the FCP is to compute $x_i$ from the given $Tx_i$; then resample, cut, and paste the $x_i$ in the signal space to generate y; and finally to compute Ty. One implementation of this method is described above with reference to FIG. 2. However, in order to reduce hardware requirements and reduce delay, it would be advantageous if the resampling, cutting, and pasting could be done directly in the transform space.

3. Scaling in the Transform Space

Let x be a signal defined on N points, $x \in C^N$. Let y be a desired representation of x, except that y is required to be defined on E points, $y \in C^E$. E could be larger or smaller than N; i.e., y may be an upscaled or downscaled representation of x. Let M, $L \in Z^+$ be defined such that E/N=M/L and (M,L)=1.

Figure 6:
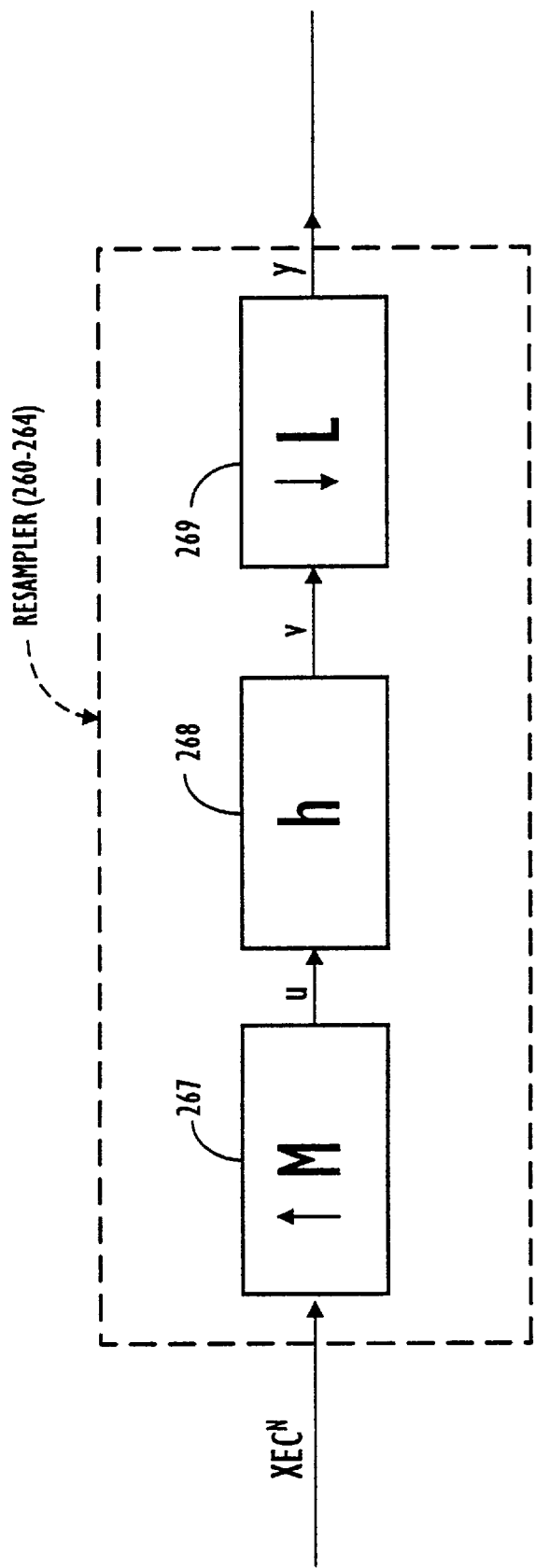
FIG. 6 is a specific implementation of a resampler which may be provided with the multipoint bridging system illustrated in FIG. 5.

The resampling circuit in FIG. 6, which may be used for each of resamplers $260 \to 264$, will deliver a suitable y (see, e.g., Chapter 4 of P. P. Vaidyanathan and Chapter 3 of Oppenheim and Schafer, the disclosures of which have been expressly incorporated by reference above) under some restrictions on a filter 268 (i.e., filter h). The output y is sometimes called a fractionally-resampled representation of x. The operation of the circuit in FIG. 6 is described below.

The input to the circuit is a signal $x \in C^N$ which when upsampled by filter 267 generates $u \in C^{MN}$. The equation $$u(n) = \begin{cases} x(n/M) & , M|n \\ 0 & , M\!\not|\,n \end{cases} \quad (3)$$

where $n \in Z_{MN}$, defines the upsampling operation performed by filter 267. The signal u is filtered by filter 268 (i.e., filter h) having an impulse response $h \in C^{MN}$ to give $v \in C^{MN}$, which is in turn downsampled by a filter 269 to obtain $y \in C^{MN/L}$. The equation $$y(n) = v(Ln), \quad (4)$$

where $n \in Z_{ZM/L}$, defines the downsampling operation performed by filter 269. The filter h (i.e., filter 268) may be a low pass filter whose support in the Fourier space is controlled to smooth the result of upsampling by filter 267 and to avoid aliasing due to downsampling by filter 269. The necessary constraints on filter h are discussed in detail in the sections provided below. See, also, e.g., Section 4.1.1 of Vaidyanathan and Section 3.6 of Oppenheim and Schafer, each of which was noted above. These references discuss constraints on the filter h for input signals in $1^2(z)$, the Hilbert space of absolutely square summable sequences defined on the entire line of integers.

From FIG. 6 and equations (3) and (4), the following relation may be obtained between the vectors x and y. For $n \in Z_{MN/L}$, $$y(n) = u(Ln) = \sum_{m \in Z_{MN}} u(m)h(Ln-m) = \sum_{\substack{m \in Z_{MN} \\ M|m}} x(m/M)h(Ln-m).$$

In transform space video bridging, the signal x is generally not known. Only the image of signal x under some transform is known. In addition, only the image of the output y under some transform is wanted. The following theorem establishes a relationship between the transform space images $\hat{x}$ and $\hat{y}$ of x and y. The theorem makes no assumptions concerning any constraints on the filter h (i.e., filter 268) in FIG. 6.

4. A Transform Space Scaling Theorem

Let $N, M, L \in Z^+$ be fixed. Define $E = MN/L \in Z^+$. Let $$B_N = \{\phi_r^N\}_{r \in Z_N}$$

be an orthonormal basis for $C^N$, and $$B_E = \{\psi_r^E\}_{r \in Z_E}$$

be an orthonormal basis for $C^E$. Let $T_N$ be the transform defined by $B_N$, and $T_E$ the transform defined by $B_E$. Let $\hat{x}T_N x, \hat{y}=T_E y$. Define vector $$\chi_{rn}^N \in C^N$$

by $$\chi_{rn}^N(P) = \begin{cases} \psi_r^E\left(n + \frac{Mp}{L}\right) & , L|(n+Mp) \\ 0 & , L\nmid(n+Mp) \end{cases} ; r \in Z_E, n \in Z_{MN}, p \in Z_N.$$

Define tensor $\lambda \in C^{N \times E \times MN}$ by $$\lambda(s, r, n) = <\phi_s^N, \chi_{rn}^N>_{C^N}; s \in Z_N, r \in Z_E, n \in Z_{MN}.$$

Define matrix $\Lambda \in C^{E \times N}$ by $$\Lambda(r, s) = \sum_{n \in Z_{MN}} \lambda(s, r, n) h(n); r \in Z_E, s \in Z_N.$$

Then, $$\hat{y}(r) = \sum_{s \in Z_N} \Lambda(r, s) \hat{x}(s); r \in Z_E.$$

5. Constraints on the Support of the Filter h

The filter h (i.e., filter 268) in FIG. 6 has a dual purpose. It has to be designed to smooth the result of the upsampling operation performed by filter 267, and also to forestall any aliasing that may result from the downsampling performed by filter 269. This section establishes two constraints on the support of the Fourier space image Fh of filter h that are found necessary for the proper operation of the resampling circuit in FIG. 6.

Define the Fourier transform $Fx \in C^N$ of a signal $x \in C^N$ by the following equation:

$$(\Im x)(m) = <x, e^{-j2\pi m \cdot /N}>_{C^N}$$

$$= \sum_{s \in Z_N} x(n) e^{j2\pi mn/N},$$

for $m \in Z_N$. Now consider the Fourier space image Fu of $u \in C^{MN}$ in FIG. 6. For $m \in Z_{MN}$, $$(\Im u)(m) = \sum_{n \in Z_{MN}} u(n) e^{\frac{j2\pi mn}{MN}} \quad (5)$$

$$= \sum_{\substack{n \in Z \\ M|n}} x(n/M) e^{\frac{j2\pi mn}{MN}}$$

$$= \sum_{p \in Z_N} x(p) e^{j2\pi mp/N}$$

$$= (\Im x)(m \bmod N).$$

From the above equation (5), Fu consists of M copies of Fx, evenly spaced along $Z_{MN}$. In order to smooth u, i.e., in order to interpolate u at those points where it does not consist of values inherited from x, all but one (the baseband) copies of Fx must be eliminated by a low pass filter—filter h in FIG. 6. Therefore, the Fourier image of filter h must not spill outside of the interval $$[O, \lfloor N/2 \rfloor] \cup [MN-N+\lfloor N/2 \rfloor+1, MN-1] \subseteq Z_{MN}.$$

That gives us one constraint on the filter h.

Next consider the relationship between the Fourier space images of y and v in FIG. 6. For $m \in Z_E$, $$(\Im y)(m) = \sum_{n \in Z_E} y(n) e^{j2\pi mn/E}$$

$$= \sum_{n \in Z_E} v(Ln) e^{j2\pi mn/E}$$

$$= \sum_{p \in Z_{MN}} v(p) e^{\frac{j2\pi mP}{MN}}$$

$$L|p$$

Define a "picket-fence" vector $\amalg_L^{MN} \in C^{MN}$;

$$\amalg_L^{MN}(p) = \begin{cases} 1, L|p \\ 0, L\nmid p \end{cases}.$$

Then, $$(\Im y)(m) = \sum_{p \in Z_{MN}} v(p) \amalg_L^{MN}(p) e^{\frac{j2\pi mp}{MN}}$$

$$= (\Im(v \amalg_L^{MN}))(m)$$

$$= \frac{1}{MN} ((\Im v) * (\Im \amalg_L^{MN}))(m).$$

The Fourier space image of a picket-fence vector is another picket-fence vector. Specifically, $$\Im \amalg_L^{MN} = E \amalg_E^{MN},$$

where $E = MN/L$. From the last two above-noted equations, for $m \in Z_E$, the following equation (6) is derived:

$$(\Im y)(m) = \frac{1}{L} (\amalg_E^{MN} * (\Im v))(m). \quad (6)$$

The above equation (6) has to be interpreted with some care because $\amalg_E^{MN} * (Fv) \in C^{MN}$, while $Fy \in C^E$. Further, equation (6) indicates that the Fourier image of y consists of a sum of shifted copies of the Fourier image of v, where the shifting is done along $Z^{MN}$. Therefore, aliasing will result, unless the support of Fv is constrained. Because supp (Fv) $\subseteq$ supp (Fh), a second constraint is inferred on filter h in FIG. 6, that is: supp(Fh) $\subseteq$ [O, $\lfloor E/2 \rfloor$] $\cup$ [MN-E+$\lfloor E/2 \rfloor$+1, MN-1] $\subseteq Z_M$. With this constraint, equation (6) will produce no aliasing. In fact, when this constraint holds, equation (6) can be written as the following equation (7):

$$(\Im y)(m) = \frac{1}{L} (\Im v)(m), \quad (7)$$

for $m \in Z_E$.

Combining the two constraints on Fh, the following relation (8) is derived:

supp$(Fh) \subseteq$ [$O$, min$\{\lfloor E/2 \rfloor, \lfloor N/2 \rfloor\}$] $\cup$ [$MN+1-$max$\{E-\lfloor E/2 \rfloor, N-\lfloor N/2 \rfloor\}$, $MN-1$] $\subseteq Z_{MN}$. (8)

6. The Shape of the Filter h

The design of a low-pass finite impulse-response (FIR) filter begins, conventionally, with the specification of filter pass and stop bands in the Fourier space, and with the specification of admissible ripple in these bands. The more stringent these constraints are, the larger is the number of taps needed. The requirements for filter h (i.e., filter 268) of FIG. 6 are a little different from those of the classical approach. The support of filter h need not be constrained in the signal space. Instead, hard Fourier-space support constraints that are required by the relation (8) are imposed on filter h.

The simplest filter h that meets the constraints of the relation (8) is a filter with a rectangular pulse shape in the Fourier space. With this choice of shape for filter h in the Fourier space, the signal space image of h will decay inversely with distance from the origin. This is so because the Fourier space image is, in some sense, "discontinuous". The smoother the Fourier space image of the filter h is, i.e., the larger the number of its "derivatives" that exist, the faster will h decay in the signal space (see, e.g., pp. 19–20 in A. Kumar, "Time-Frequency Analysis and Transform Coding," D.Sc. dissertation, Dept. Comp. Sc., Wash. U., St. Louis (1990)), the content of which is hereby expressly incorporated herein in its entirety.

The fast signal-space decay of the filter h is a desirable property, because the numerical value of a pixel will be highly correlated with the numerical values of the pixels in its immediate neighborhood, and not at all with the values of pixels far away. Because there are "brick-wall" bounds (i.e., rigid boundaries) on the support of the filter h in the Fourier space, the signal space filter h will smear the entire line $Z_{MN}$. That cannot be helped, but the decay of the filter h can be controlled.

At least two classes of methods may be used for shaping the filter h. The first class of methods involves modelling Fh as a B-spline in the Fourier space. The cubic B-spline, which will give a fourth-order polynomial decay in the signal space, is the convolution of two triangular waveforms (see, e.g., p. 48 in Y. Meyer, "Wavelets: Algorithms and Applications," Soc. for Indust. & Appl. Math., Philadelphia, Pa. (1993)). Higher order splines can be built by convolving the cubic spline with rectangular waveforms. Each successive convolution will improve the smoothness of the waveform. Each convolution also enlarges the support of the spline function, but initial supports can easily be chosen such that the final result fits within the interval in the relation (8).

A second class of methods for shaping the filter h involves the iterative calculation of an eigenvector of a certain double projection operator (see, e.g., pp. 1703–1704 in A. Kumar, D. R. Fuhrmann, M. Frazier, and B. Jawerth, "A New Transform for Time-Frequency Analysis," IEEE Trans. SP, Vol. 40. No. 7, pp. 1697–1707 (July 1992) and pp. 19–20 in M. Frazier and A. Kumar, "An Introduction to the Orthonormal Wavelet Transform on Discrete Sets," pp. 51–95 in Benedetto and Frazier (eds.), "Wavelets: Mathematics and Applications," CRC Press, New York (1993). The contents of these references are expressly incorporated by reference herein in their entireties. It is also possible to refine the double projection method discussed in those references.

7. The Level of the Filter h

The shape of the filter h in the signal and Fourier spaces has then been established. The next issue is how large should the magnitude of h be.

A governing principle is that the average illumination produced by the signal x and that produced by the derived signal y, should be the same, despite the change in their physical dimensions. An image painted on the face of a cathode-ray tube will illuminate a pixel in direct proportion to the appropriate sequence-element of the signal in the signal space. Since the zero'th Fourier coefficient, given the definition of the Fourier transform herein, is the sum of all scalar elements of the signal in the signal space, the governing principle requires the following relation (9):

$$\frac{1}{E}(\Im y)(0) = \frac{1}{N}(\Im x)(0). \tag{9}$$

If the vector x represents an image, then it can be assumed that $x(i) \geq 0$, $\forall i$. This will be so if the black-level is represented by a zero and maximum brightness by the integer $2^n - 1$ for some $n \in Z^+$, as is usually the case. Then $(Fx)(0) > 0$, if the image is not all dark.

From the equation (7), and under the assumption that the relation (8) holds $$L(\Im y)(0) = (\Im v)(0). \tag{10}$$

Because v is the output of filter h with input u, $$(\Im v)(0) = (\Im h)(0)(\Im u)(0). \tag{11}$$

From the equation (5), $$(\Im u)(0) = (\Im x)(0). \tag{12}$$

From relations (9)–(12) and given the knowledge that (Fx)(0) and (Fy) (0) are both positive, it is easy to see that:

$$(Fh)(0) = M.$$

This completes the design of a particular example embodiment of the filter h.

Figure 7:
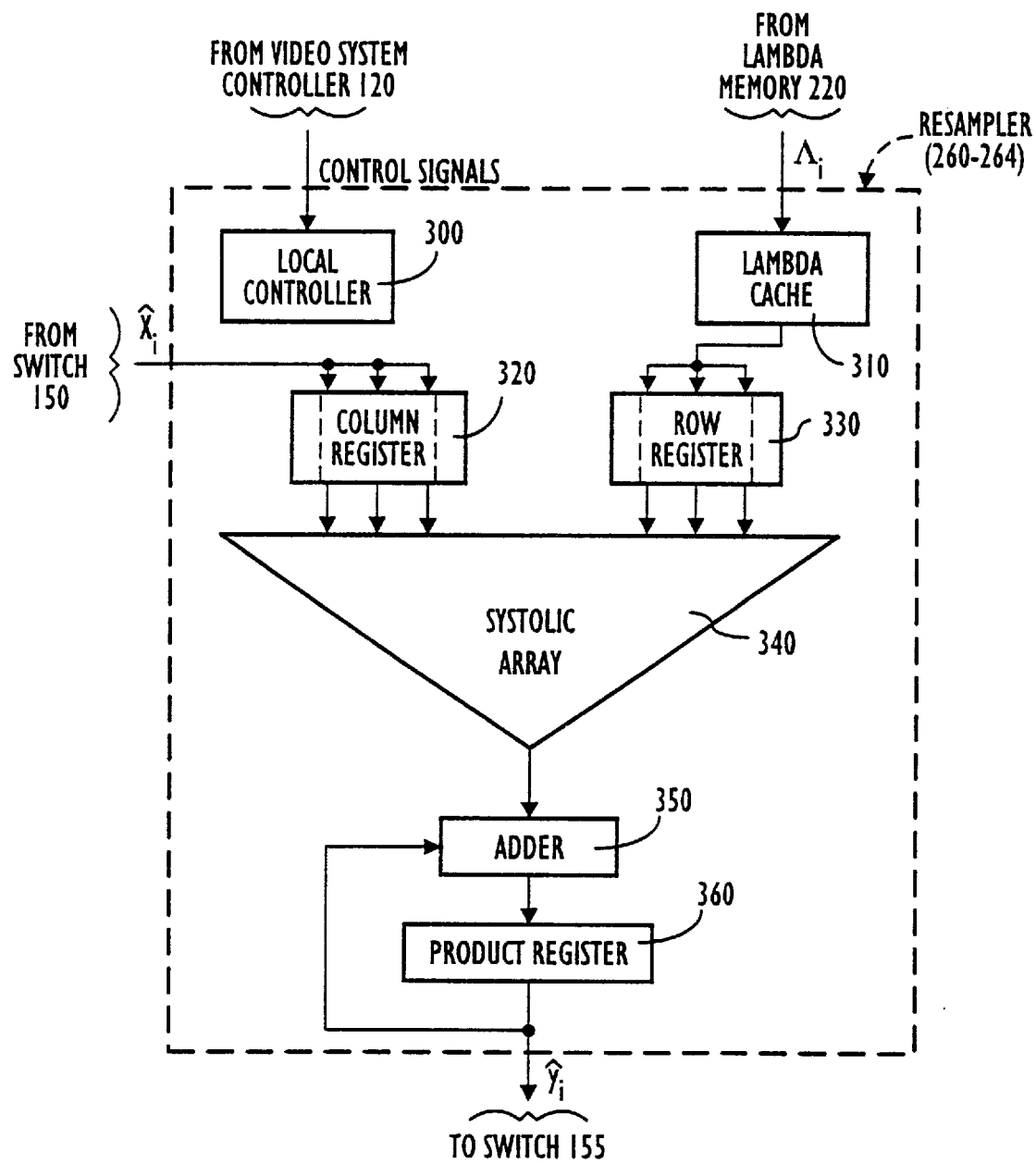
FIG. 7 illustrates an alternative implementation of a resampler.

Resamplers 260–264 may be implemented through a matrix multiplication architecture instead of the filter design and resampling circuit of FIG. 6. Referring now to FIG. 7, a more detailed description of the matrix multiplication that may be performed by resamplers 260–264 will be discussed below.

As noted above, resamplers 260–264 may resize the various frame images in the transform space by performing matrix multiplication of the vectors of each frame with a particular matrix provided from Lambda memory 220. FIG. 7 illustrates a block diagram of a matrix multiplication architecture that may be used to implement resamplers 260–264.

As shown in FIG. 7, resamplers 260–264 may include a local controller 300, that may, for example, be implemented with a microcontroller for controlling the various components of the resampler based on the control signals received from video system controller 120. The local controller 300 may control the timing of the operations performed by the various components of the resamplers 260–264, including Lambda cache 310, a column register 320, a row register 330, a systolic array 340, an adder 350, and a product register 360.

Lambda cache 310 receives and stores a matrix table $\Lambda_i$ transmitted from Lambda memory 220. A suitable cache memory device may be used for Lambda cache 310 for storing such matrices. By providing Lambda cache 310, the Lambda memory 220 may be freed to provide matrix data to the other resamplers without being tied up by any one particular resampler. The matrix $\Lambda_i$ stored in Lambda cache 310 may be loaded into row register 330 one row at a time. In addition, the image $x_i$ from switch 150 is loaded into column register 320. If N is a large integer, then column register 320 and row register 330 may be made to hold only short vector segments at a time. In FIG. 7, column register 320 and row register 330 are shown as being each three numbers wide, whereas N is shown to equal 6.

Under the control of local controller 300, column register 320 and row register 330 feed systolic array 340. The systolic array 340, which is further described below with reference to FIG. 8, has a width that is equal to that of the column register 20 and row register 330. Systolic array 340 calculates the matrix-vector products based on data provided by column register 320 and row register 330.

If the width of the column and row registers 320 and 330, and of the systolic array 340, is less than N, then an adder 350 may be provided to add partial sums in order to build up the elements of the resized units $y_i$. For this purpose, a product register 360 may be provided so that the partial sums may be added by adder 350. The final output $y_i$ from FIG. 7 is selectively provided to the frame composers 170 by switch 155 (see, for example, FIG. 5).

Figure 8:
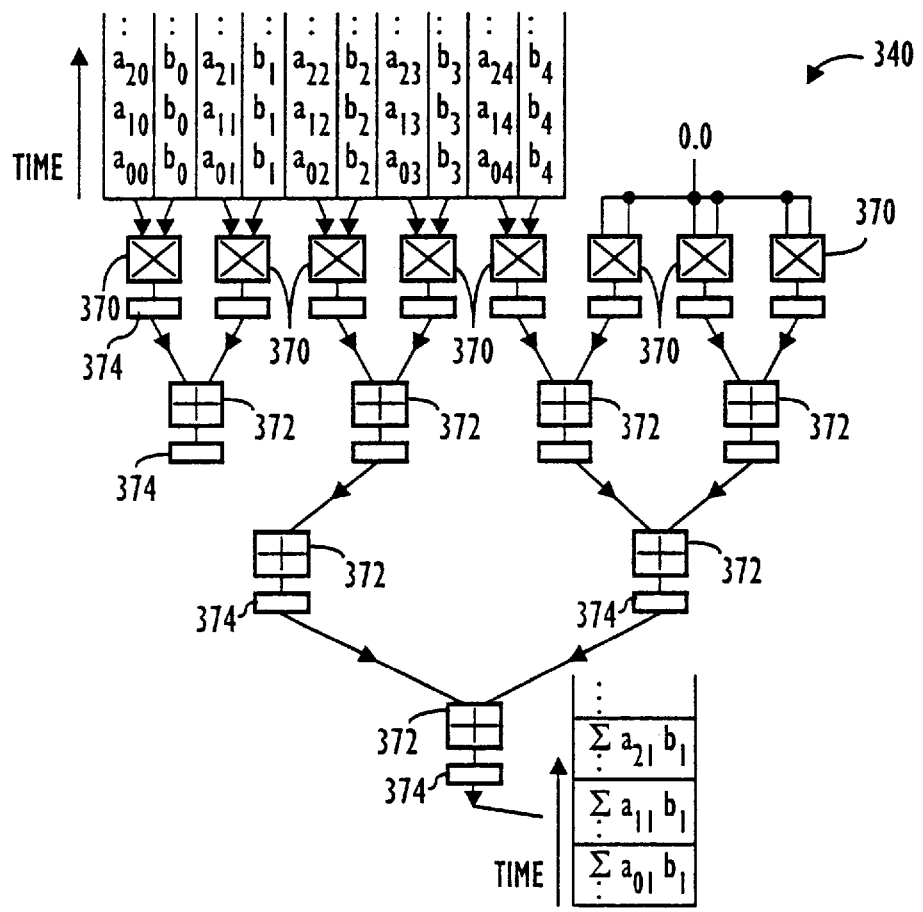
FIG. 8 illustrates an example embodiment of a systolic array which may be utilized in the resampler illustrated in FIG. 7.

As shown in FIG. 8, the systolic array 340 may comprise a triangular array of multipliers 370 and adders 372 which store their respective results in a node register 374, so that the result is available for the next set of operations. Node registers 374 may include dynamic shift-registers (not shown) that run on a two-phase clock (see, for example, pages 100–101 in J. Mavor, M. A. Jack, and P. B. Denyer, "Introduction to MOS LSI Design," Addison-Wesley, Reading, Mass. (1983) or Chapter 3 in C. Mead and L. Conway, "Introduction to VLSI Systems," Addison-Wesley, Reading, Mass. (1980). Because of the speed at which these registers are required to operate, they will not be required to work in a static mode. Instead, once the inputs to the array are primed, the array will produce, at each and every clock cycle, a complete partial sum at the apex of the inverted triangular array of multipliers and adders.

FIG. 8 shows a systolic array of order eight, and how the product of a matrix in $C^{E \times 5}$ with a vector in $C^5$ may be computed.

Multipliers 370 in the first row of systolic array 340 must be implemented to perform the operations in a fast manner in order to match the speed of the adders in the subsequent rows. The multipliers in FIG. 8 may themselves be implemented as systolic arrays with rows adders, each row handling a single sum in Booth's algorithm. In this case, the numbers in the row register 330 and column register 320 must be presented in two's-complement notation. In addition, a single Manchester-carry adder cell may be used to build full-adders or, if the timing of the operation is tight, a carry-lookahead cell, or a combination of Manchester and carry-lookahead cells, could be employed (see, for example, pages 118–124 in the Mavor et al. reference noted above).

As noted above, each of the resamplers (160–164 and 260–264) of the present invention may consist of two "one-dimensional" scaling circuits, with one that resizes the rows and another that resizes the columns. Each of the scaling circuits of a given resampler may be placed in tandem, with a frame buffer being provided in series between, before and after the two scaling circuits.

Figure 9:
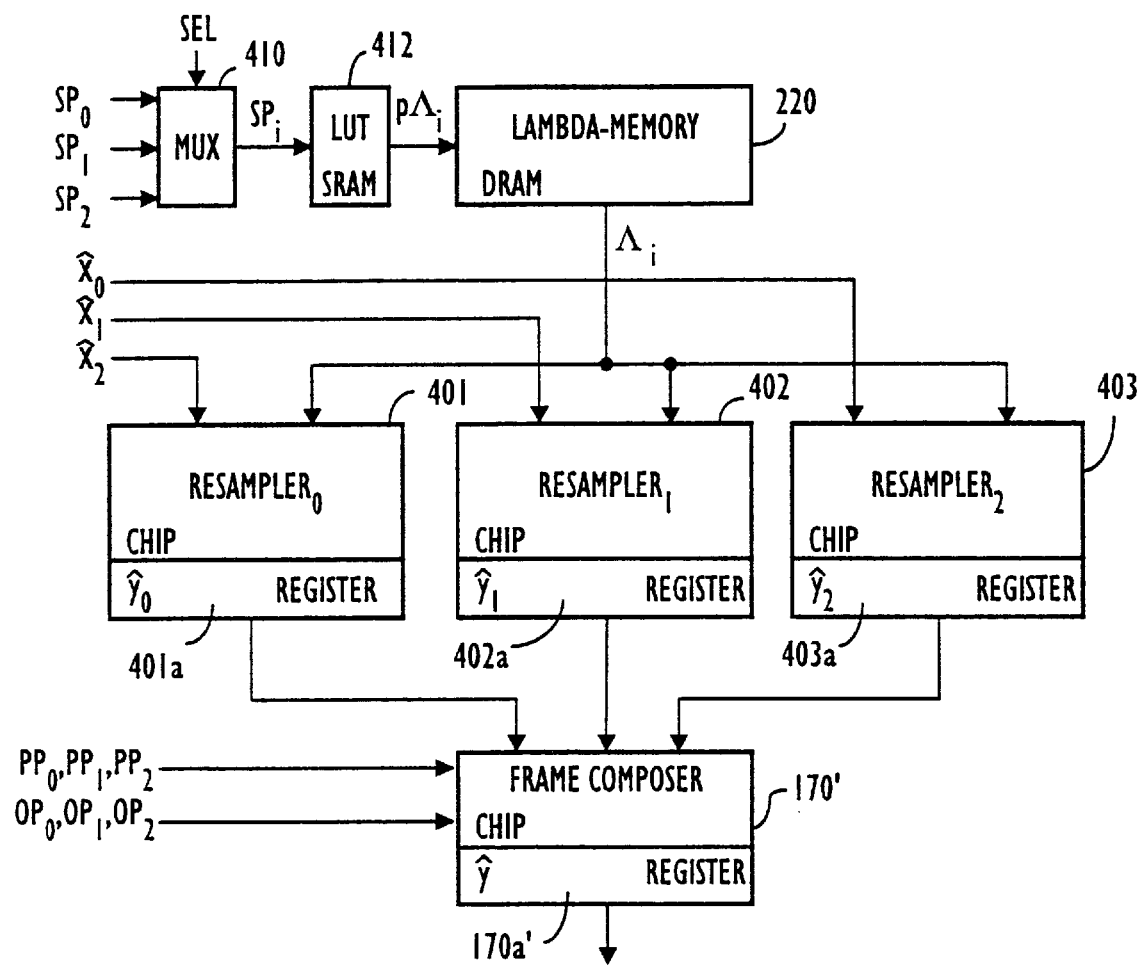
FIG. 9 is a block diagram of an exemplary architecture for performing one-dimensional bridging.

FIG. 9 illustrates in more detail the interconnection between the lookup table (LUT) 121, Lambda memory 220, resampler 260–262, and frame composer 170 illustrated in FIG. 5. As illustrated in FIG. 9, a single frame composer chip 170' may be provided for performing frame composing of frames from each of resamplers chips 401, 402, and 403. Each resampler chip 401, 402, and 403, may be configured to perform matrix multiplication utilizing the appropriate matrix information input from Lambda-memory 220 and the video image in transform space $\hat{x}_i$.

As shown in FIG. 9, the resampling-related circuitry is shown to include a multiplexer 410, a lookup table (LUT) 412 (which corresponds to LUT 121 in FIG. 5), and a Lambda-memory 220, which are connected in a cascaded fashion. An output of Lambda-memory 220 is then connected to a plurality of respective inputs of resampler chips 401, 402, and 403. Each of the illustrated resampler chips 401–403 has an output register 401a, 402a, and 403a, which holds an output value $\hat{y}_i$. Each of the output registers 401a–403a is connected to an input of frame composer chip 170', which also has an output register $170_a'$. Each of the size parameters $SP_i$ is connected to an input of multiplexer 410. Multiplexer 410 is provided with a selection input "sel" for selecting between the various size parameters when controlling the video image of one or more of the particular locations at a particular time. The resulting selected size parameter $SP_i$ is then outputted from multiplexer 410 into lookup table 412, which outputs a parameter $P\Lambda_i$ which is then input into Lambda-memory 220 in order to cause a particular matrix to be outputted by Lambda-memory 220 and input into the respective resampler chips 401–403.

Frame composer chip 170' accepts position parameters $PP_i$ and occlusion parameters $OP_i$ as input, which further define the positioning of image windows to be utilized for each of the resampled video images, (i.e., the amount of occlusion) of each of the image windows.

Several additional or alternative features may be provided in an video teleconferencing system that are compatible with the various embodiments disclosed herein. Such features may include pull-down menus for allowing a user to interface and thus control the video composition and the bridging systems, help menus, multimedia display support, and site-identification icons. In addition, the system may be provided with a bridge reservation system, an accounting and billing system, and party add/drop options. Other features may also be provided such as dial access, audio-only connections, side-conference support, flashing window signalling for signalling that a particular party is currently speaking, and an automatic foregrounding of a current speaker's window.

Using RNS Arithmetic in Galois Fields

A Galois field is a finite-field of order $q \in Z^+$. See, e.g., Chapter 5 in I. N. Herstein, Topics in Algebra, 2 ed., John Wiley & Sons, New York, 1975; Chapters 2 and 5 in R. E. Blahut, Fast Algorithms for Digital Signal Processing, Addison-Wesley, Reading, Mass., 1985; and W. K. Jenkins, "Finite Arithmetic Concepts," pp. 611–675 in Mitra and Kaiser (eds.), Handbook for Digital Signal Processing, John Wiley & Sons, New York, 1993. A Galois field with q elements is written as GF(q). If q is a prime number, then $\exists g \in GF(q)$ such that the (q−1) integer powers $g^1, g^2, \ldots, g^{q-1}$ of g equal every number in GF(q) but zero. The number g is called a generator because it generates, in the stated sense, every number in GF(q) but zero. For q prime, when a generator exists, multiplication and division in GF(q) are very easy and very fast. They can be accomplished through the addition of the integers that are the generator-indices of the operands. This is just like multiplication and division using logarithms. Zeros and multiplications by zeros must be handled as exceptions, with a special flag bit. Thus, in the above-described embodiments (e.g., in the architecture in FIG. 8), where a number of additions and divisions must be performed very quickly, arithmetic in a Galois field is an attractive alternative.

On the down side, data must be embedded in a Galois field before arithmetic can be performed, and the size of the Galois field must be large enough to accommodate the desired precision of calculation. The embedding of data in a field also produces a new source of noise, quite akin to finite-word-length and quantization noise. Once the embedding is done, however, all ensuing arithmetic is error-free, and is not subject to any round-off or finite-word length effects.

Whenever arithmetic operations are performed in any finite field or ring, greater computational efficiency can be gained through the use of residue arithmetic using a set of relatively-prime moduli. Arithmetic operations are performed on residues relative to the given moduli, and the results can be stitched back together using a theorem called the Chinese Remainder Theorem (CRT), See, e.g., pp. 55–61 in R. E. Blahut, Fast Algorithms for Digital Signal Processing, Addison-Wesley, Reading, Mass., 1985; and p. 617 in W. K. Jenkins, "Finite Arithmetic Concepts," pp. 611–675 in Mitra and Kaiser (eds.), Handbook for Digital Signal Processing, John Wiley & Sons, New York, 1993. This method of computation is called residue number system (RNS) arithmetic, and can sometimes yield extremely efficient machine architectures.

Galois field and residue arithmetic methods may be used when the frame-composing computational burden is too large to be handled in real-time by more usual arithmetic, as might happen, for example, if the composer or bridge is used for HDTV images. Galois fields and RNS arithmetic may also be considered for use in less onerous applications like bridging H.261 streams.

With respect to timing and delay, in order to have maximum-rate operation, American National Standards Institute document ANSI T1.314-1991 ("Digital Processing of Video Signals-Video Coder/Decoder for Audio Visual Services at 56–1536 kbit/s," ANSI, New York (1991)) requires the processing of 30 CIS images per second. In a case that is most computationally stressful, a CIF frame would be resized from 352×288 to 344×280. For the Y (luminance) component, this means 352×344+288× 280≦202,000 multiplications per second for the resealing operation. The Cr, Cb color-difference components will together need half as many multiplications per frame, bringing the total to 303,000 multiplications per frame=303,000× 30≦9.1 million multiplications per second. This translates to $(9.1)^{-1} \times 10^{-6}$ s ≅110 ns per multiplication.

The multipliers can be fixed-point devices. The incoming $\hat{x}_i$ are arrays of 4 digit numbers in the range −2048 to 2047. The entries in the resampling matrix Λ can be rounded to about 6 digits without adding any noise that could be of magnitude comparable to the inevitable quantization noise introduced by modified Huffman or arithmetic coding. Commercial state-of-the-art fixed-point multiplier-accumulators can work at 50 ns per operation, for bipolar devices, while unipolar MOS devices are available for 100 ns operation. One multiply-accumulator chip per incoming connection and per outgoing connection per bridge, operated under microcontroller control, can be used to do the resizing, as an alternative to the systolic array illustrated in FIG. 8. The systolic array will be useful in still higher-speed operation, e.g., in bridging high-definition video.

The delays in both the systolic array and the commercial multiplier-accumulator approaches will be less than four frame-intervals=433 ⅓₀=133 ns, as evident from the frame buffer requirements referred to above for a two-indentional transform space video bridge.

The various embodiments of the video signal composition and bridging system disclosed herein may be utilized in several different manners. An example operation of the same will now be described. Referring to FIG. 1, each of user locations A, B, and C may be located at different parts of the country, e.g., Los Angeles, Calif.; New York, N.Y.; and Washington, D.C., respectively, and the system may be provided in a video teleconferencing system. When user A in Los Angeles is speaking with users B and C in New York and Washington, D.C., respectively, user A may control, by use of an appropriate input device 14 at its terminal equipment 10, the manner in which each of the image windows of each of the respective participants in the video teleconference is displayed. For example, as shown in FIG. 3, user A may specify the relative depth of each image window A, B, and C (which show participants A, B, and C, respectively) by specifying a $Z_i$ (occlusion parameter) accordingly, and may specify the position of each of the windows A, B, C, by specifying position parameters $X_i$, $Y_i$. In addition, participant A may specify the size of each of the image windows by specifying a scaling factor $S_i$. As noted previously, the particular types of parameters and interpretation of the values assigned to those parameters (used to control the position of the image windows, the amount of occlusion (i.e., relative depth) and the size/scaling factor of each of the image windows), may be varied without substantially detracting from the benefits associated with the video signal composition and bridging system disclosed herein.

Each participant of a video teleconference, including participants A, B, C, and any other participants participating in the teleconference, may specify each of these parameters at its associated terminal equipment 10, in order to define the manner in which he or she may view the images of each of the other participants (and his or her self). A user interface may be provided, which utilizes input device 14, for allowing the user to choose among various parameter values to control the manner in which the various image windows are placed on the screen 12. Such parameters may be specified by the participant/user before the video teleconference is set up, may be initially set to default values, which will remain set unless changed by the user, and/or may be changed by the user while the video teleconference is going on.

The video signal composition and bridging control system disclosed herein allows user/participants at each of the respective locations to be able to modify these display configuration parameters, and thus to control the manner in which the image of each participant can be viewed at each respective location/terminal equipment. Thus, each display screen at each location/terminal equipment can be set so that it displays the image windows in a different manner.

Different video teleconferencing sites may receive and transmit images with different aspect ratios. The standard aspect ratio is 4:3, while the aspect ratio for HDTV is 16:9. The illustrated embodiments of the video signal composition and bridging system disclosed herein will allow a video teleconferencing site having one specific aspect ratio (e.g., 4:3) to be interfaced with another video teleconferencing site. For example, the video signal composition and bridging control system disclosed herein can be used to allow video teleconferencing traffic to be transferred between two different kinds of site installations in a V-Chan video teleconferencing system (developed by Southwestern Bell). The V-Chan network carries SBC video teleconferencing traffic, and may have at least two different kinds of sites, including VW (Video Window) sites and ordinary 4:3 aspect ratio sites. VW sites use the same DS1 codecs that are used by 4:3 sites, except that the input video is deliberately distorted through the use of an anamorphic lens on the camera. This lens exaggerates the horizontal field of view in order to capture a picture that has a 16:9 aspect ratio. So far as the codec is concerned, it treats the captured image exactly as it would a 4:3 image conforming to the NTSC standard. At the receiving end, the VW projector is adjusted to "overscan" horizontally, so that the displayed image recaptures its 16:9 aspect ratio.

The VW sites (and other HDTV aspect-ratio sites) and 4:3 sites will not interoperate. The cross-bridging system disclosed herein is capable of cross-bridging such varying aspect-ratio sites. Within the specific context of a V-Chan system, a VW site may be configured to identify itself as a VW site to the cross-bridging control system, e.g., by transmitting a prearranged code word to the cross-bridging control system. Once that is done, the cross-bridging control system will know that it should expect a "scrunched" image from that site (having a higher aspect-ratio), and that it should in turn transmit such high aspect-ratio images to that site. The horizontal and vertical resampling rates may be appropriately adjusted to a certain aspect-ratio, depending upon the site that a particular video image is originating from and the site to which the video image is being transmitted. This flexibility, i.e., the ability to cross-bridge between sites having different aspect ratios is possible because of several particular features provided in the cross-bridging system disclosed herein, including, among other things, the use of digital filters to perform the resampling. It is noted that resampling by rational factors is necessary in order for the video signal composition and bridging control system to cross-bridge VW and 4:3 sites. Resampling by integer factors alone will not suffice.

Accordingly, two advantages of the present invention are the ability for each user/participant at each separate location to control the manner in which the various image windows (which illustrate or show the various participants of the video teleconference) are displayed on its particular display screen, and further the ability to cross-bridge video information between sites having different video formats and/or different aspect ratios, (e.g., sites having a 4:3 aspect ratio may be interfaced or cross-bridged with sites having an HDTV aspect ratio, i.e., a 16:9 aspect ratio).

The composition and bridging unit described herein may also connect remote sites that use different kinds of codecs, and that transmit/receive at different rates, and can do so without dropping quality to the lowest common denominator.

While the invention has been described with reference to several exemplary embodiments, it is understood that the words which have been used herein are words of description and illustration, rather than words of limitation. Changes may be made, within the purview of the appended claims, without departing from the scope and spirit of the invention and its aspects.

Although the invention has been described herein with reference to particular means, materials and embodiments, the invention is not intended to be limited to the particulars disclosed herein; rather, the invention extends to all functionally equivalent structures, methods and uses, such as, within the scope of the appended claims. For example, modifications may be made to the specific circuits illustrated herein without detracting from the desired overall functionality of the system, by, e.g., providing only one channel decoder and separator instead of separate channel decoders and separators 110 as illustrated in FIGS. 2 and 5. Further, other compression and transform methods may be used instead of operations that are based on the BDCT discussed above. For example, transform methods based on Differential Pulse Code Modulation (DPCM), Vector Quantization (VQ), or Wavelets may be utilized.

What is claimed is:

1. A flexible multipoint composition and bridging system for bridging a plurality of users located at different terminal end locations of a communications network, each of said locations including terminal equipment for transmitting and receiving video images and data signals, said data signals including display configuration information for video images originating from at least one of said locations, said system comprising:

means for receiving said video images and said data signals from each of said locations;

means for generating respective video montage images for each of said locations based on said data signals received by said receiving means, said generating means including means for selectively resizing said video images received by said receiving means based on said data signals, and a plurality of frame composers for composing the resized video images and for producing said respective video montage images for each of said locations based on said data signals; and means for transmitting said respective video montage images generated by said generating means to each of said locations so that said respective video montage images may be displayed by a display device provided at each of said locations, whereby each of said terminal end location users may optionally and individually configure the respective video montage image displayed at their location based on said data signals transmitted from their location.

2. The system according to claim 1, wherein said generating means further comprises inverse transform means for performing an inverse transform operation to convert received video images represented in transform space to video images represented in signal space, and wherein said resizing means comprises means for selectively resizing said video images while said video images are represented in signal space.

3. The system according to claim 2, wherein said inverse transform means comprises means for performing an Inverse Blocked Discrete Cosine Transform.

4. The system according to claim 2, wherein said generating means further comprises transform means for performing a transform operation to convert said video montage images represented in signal space into video montage images represented in transform space.

5. The system according to claim 4, wherein said transform means comprises means for performing a Blocked Discrete Cosine Transform.

6. The system according to claim 1, wherein said resizing means comprises means for selectively resizing said video images while said video images are represented in signal space.

7. The system according to claim 1, wherein said resizing means comprises means for selectively resizing said video images while said video images are represented in transform space.

8. The system according to claim 1, further comprising means for selectively inputting display configuration information which defines the manner in which said video montage images are displayed by said display device provided at each of said locations.

9. The system according to claim 8, wherein said display configuration information comprises information regarding the position, on said display device, of a display window provided for components of each video montage image.

10. The system according to claim 8, wherein said display configuration information comprises information regarding the relative depth, on said display device, of a display window provided for components of each video montage image.

11. The system according to claim 8, wherein said display configuration information comprises information regarding the size, on said display device, of a display window provided for components of each video montage image.

12. The system according to claim 8, wherein said display configuration information comprises information regarding the position, the relative depth, and the size, on said display device, of a display window provided for components of each video montage image.

13. The system according to claim 8, wherein said display configuration information comprises information for zooming, on said display device, components of said video montage image.

14. The system according to claim 8, wherein said display configuration information comprises information for panning, on said display device, components of said video montage image.

15. The system according to claim 1, further comprising said terminal equipment, wherein said terminal equipment at each of said locations comprises means for capturing video and audio teleconferencing information for transmission to other ones of said locations.

16. The system according to claim 1, wherein said terminal equipment at each of said locations comprises means for selectively inputting display configuration information which defines the manner in which components of each of said video montage images is displayed by a display device provided at said terminal equipment.

17. The system according to claim 1, wherein said generating means further comprises means for generating said respective video montage images in signal space.

18. The system according to claim 1, wherein said generating means further comprises means for generating said respective video montage images in transform space.

19. A method for bridging a plurality of users located at different terminal end locations of a communications network, each of said locations including terminal equipment for transmitting and receiving video images and data signals, said data signals including display configuration information for video images originating from one or more of said locations, said method comprising:
  receiving said video images and said data signals from each of said locations;
  generating respective video montage images for each of said locations based on said data signals received, said generating including selectively resizing the received video images based on said data signals, and composing the resized video images in order to produce said respective video montage images for each of said locations based on said data signals; and
  transmitting said respective video montage images to each of said locations so that said respective video montage images may be displayed by a display device provided at each of said locations,
  whereby each of said terminal end location users may optionally and individually configure the respective video montage image displayed at their location based on said data signals transmitted from their location.

20. The method according to claim 19, wherein generating said respective video montage images further comprises performing an inverse transform operation to convert received video images represented in transform space to video images represented in signal space, and wherein said resizing comprises selectively resizing said video images while said video images are represented in signal space.

21. The method according to claim 20, wherein said performing of an inverse transform operation comprises performing an Inverse Blocked Discrete Cosine Transform.

22. The method according to claim 20, wherein said generating further comprises performing a transform operation to convert said video montage images represented in signal space into video montage images represented in transform space.

23. The method according to claim 22, wherein said performing of a transform operation comprises performing a Blocked Discrete Cosine Transform.

24. The method according to claim 19, wherein said resizing comprises selectively resizing said video images while said video images are represented in signal space.

25. The method according to claim 19, wherein said resizing comprises selectively resizing said video images while said video images are represented in transform space.

26. The method according to claim 19, further comprising inputting display configuration information which defines the manner in which said video montage images are displayed by a display device provided at each of said locations.

27. The method according to claim 26, wherein said display configuration information comprises information regarding the position, on said display device, of a display window provided for components of each video montage image.

28. The method according to claim 26, wherein said display configuration information comprises information regarding the relative depth, on said display device, of a display window provided for components of each video montage image.

29. The method according to claim 26, wherein said display configuration information comprises information regarding the size, on said display device, of a display window provided for components of each video montage image.

30. The method according to claim 26, wherein said display configuration information comprises information regarding the position, the relative depth, and the size, on said display device, of a display window provided for components of each video montage image.

31. The method according to claim 26, wherein said display configuration information comprises information for zooming, on said display device, components of said video montage image.

32. The method according to claim 26, wherein said display configuration information comprises information for panning, on said display device, components of said video montage image.

33. The method according to claim 19, further comprising capturing, at said terminal equipment, video and audio teleconferencing information for transmission to other ones of said locations.

34. The method according to claim 19, further comprising selectively inputting display configuration information at said terminal equipment at each of said locations, the input display configuration information defining the manner in which components of each of said video montage images is displayed by said display device provided at said terminal equipment.

35. The method according to claim 19, wherein said generating further comprises generating said respective video montage images in signal space.

36. The method according to claim 19, wherein said generating further comprises generating said respective video montage images in transform space.

37. A flexible multipoint composition and bridging system for bridging a plurality of users located at different terminal end locations of a communications network, each of said locations including terminal equipment for transmitting and receiving video images and data signals, said data signals including display configuration information for video images originating from at least one of said locations, said system comprising:

means for receiving said video images and said data signals from each of said locations;

means for generating respective video montage images for each of said locations based on said data signals received by said receiving means, said generating means including means for selectively resizing said video images received by said receiving means based on said data signals, and a plurality of frame composers for composing the resized video images and for producing said video montage images based on said data signals; and means for transmitting said video montage images generated by said generating means to each of said locations so that said video montage images may be displayed by a display device provided at each of said locations, wherein said generating means further comprises inverse transform means for performing an inverse transform operation to convert received video images represented in transform space to video images represented in signal space, and wherein said resizing means comprises means for selectively resizing said video images while said video images are represented in signal space.

38. A method for bridging a plurality of users located at different terminal end locations of a communications network, each of said locations including terminal equipment for transmitting and receiving video images and data signals, said data signals including display configuration information for video images originating from one or more of said locations, said method comprising:

receiving said video images and said data signals from each of said locations;

generating respective video montage images for each of said locations based on said data signals received, said generating including selectively resizing the received video images based on said data signals, and composing the resized video images in order to produce said video montage images based on said data signals; and transmitting said video montage images to each of said locations so that said video montage images may be displayed by a display device provided at each of said locations, wherein generating said respective video montage images further comprises performing an inverse transform operation to convert received video images represented in transform space to video images represented in signal space, and wherein said resizing comprises selectively resizing said video images while said video images are represented in signal space.

39. A method for bridging a plurality of users located at different terminal end locations of a communications network, each of said locations including terminal equipment for transmitting and receiving video images and data signals, said data signals including display configuration information for video images originating from one or more of said locations, said method comprising:

receiving said video images and said data signals from each of said locations;

generating respective video montage images for each of said locations based on said data signals received, said generating including selectively resizing the received video images based on said data signals, and composing the resized video images in order to produce said video montage images based on said data signals; and transmitting said video montage images to each of said locations so that said video montage images may be displayed by a display device provided at each of said locations, wherein said generating further comprises generating said respective video montage images in transform space.

40. A flexible multipoint composition and bridging system for bridging a plurality of users located at different terminal end locations of a communications network, each of said locations including terminal equipment for transmitting and receiving video images and data signals, said data signals including display configuration information for video images originating from at least one of said locations, said system comprising:

means for receiving said video images and said data signals from each of said locations;

means for generating respective video montage images for each of said locations based on said data signals received by said receiving means, said generating means generating said respective video montage images in transform space; and means for transmitting said respective video montage images generated by said generating means to each of said locations so that said respective video montage images may be displayed by a display device provided at each of said locations.

41. The system according to claim 1, further comprising means for enabling different video montage images to be generated for each of said locations based on said data signals received by said receiving means.

* * * * *

UNITED STATES PATENT AND TRADEMARK OFFICE
CERTIFICATE OF CORRECTION

PATENT NO. : 5,835,129
DATED : November 10, 1998
INVENTOR(S) : Arun KUMAR

It is certified that error appears in the above-identified patent and that said Letters Patent is hereby corrected as shown below:

On the title page, item [56] at column 2, the following publication should be listed as follows:
---CHANG, S.F., "Compositing and Manipulation of Video Signals for Multimedia Network Video Services", Ph.D. Dissertation, University of California at Berkeley (December 1993)---.

On the cover of the printed at item [56] column 2, the name of the "Attorney, Agent, or Firm" should be corrected to read ---Greenblum & Bernstein, P.L.C.---

Signed and Sealed this

Ninth Day of May, 2000

*Attest:*

Q. TODD DICKINSON

*Attesting Officer*   *Director of Patents and Trademarks*